(12) United States Patent
Sugio et al.

(10) Patent No.: US 9,621,889 B2
(45) Date of Patent: Apr. 11, 2017

(54) IMAGE ENCODING METHOD, IMAGE DECODING METHOD, IMAGE ENCODING APPARATUS, IMAGE DECODING APPARATUS, AND IMAGE CODING APPARATUS

(71) Applicant: Panasonic Corporation, Osaka (JP)

(72) Inventors: Toshiyasu Sugio, Osaka (JP); Takahiro Nishi, Nara (JP); Youji Shibahara, Osaka (JP); Kyoko Tanikawa, Osaka (JP); Hisao Sasai, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 524 days.

(21) Appl. No.: 14/130,505

(22) PCT Filed: Feb. 15, 2013

(86) PCT No.: PCT/JP2013/000856
§ 371 (c)(1),
(2) Date: Jan. 2, 2014

(87) PCT Pub. No.: WO2013/128832
PCT Pub. Date: Sep. 6, 2013

(65) Prior Publication Data
US 2014/0211856 A1    Jul. 31, 2014

Related U.S. Application Data

(60) Provisional application No. 61/605,870, filed on Mar. 2, 2012.

(51) Int. Cl.
H04N 7/12      (2006.01)
H04N 11/02    (2006.01)
(Continued)

(52) U.S. Cl.
CPC ....... *H04N 19/00715* (2013.01); *H04N 19/10* (2014.11); *H04N 19/577* (2014.11);
(Continued)

(58) Field of Classification Search
CPC .................................................... H04N 19/597
See application file for complete search history.

(56) References Cited

U.S. PATENT DOCUMENTS

2007/0030356 A1* 2/2007 Yea .................... H04N 13/0242
                                                      348/207.99
2009/0010323 A1    1/2009 Su et al.
(Continued)

FOREIGN PATENT DOCUMENTS

EP    2 424 240        2/2012
JP    2009-522986      6/2009
(Continued)

OTHER PUBLICATIONS

European Search Report issued Jan. 30, 2015 in corresponding European Patent Application No. 13755862.3.
(Continued)

*Primary Examiner* — Joseph Ustaris
*Assistant Examiner* — Rebecca Volentine
(74) *Attorney, Agent, or Firm* — Wenderoth, Lind & Ponack, L.L.P.

(57) ABSTRACT

An image encoding method is used for encoding a current picture on a block-by-block basis and includes: generating a reference picture list by (i) assigning a reference picture index to a reference picture referable for encoding the current picture and (ii) including the reference picture assigned the reference picture index into the reference picture list; and encoding a current block included in the current picture with reference to a reference picture that is specified, from the reference picture list, for encoding the
(Continued)

current block, wherein, when a reference picture belonging to a reference view different from a current view to which the current picture belongs has a chance of being referenced for encoding the current picture, the reference picture belonging to the reference view is added to the reference picture list in the generating.

13 Claims, 43 Drawing Sheets

(51) Int. Cl.
      *H04N 11/04*      (2006.01)
      *H04B 1/66*      (2006.01)
      *H04N 19/51*      (2014.01)
      *H04N 19/10*      (2014.01)
      *H04N 19/597*      (2014.01)
      *H04N 19/70*      (2014.01)
      *H04N 19/577*      (2014.01)
      *H04N 19/30*      (2014.01)
      *H04N 19/463*      (2014.01)

(52) U.S. Cl.
      CPC ........... *H04N 19/597* (2014.11); *H04N 19/70* (2014.11); *H04N 19/30* (2014.11); *H04N 19/463* (2014.11)

(56) References Cited

U.S. PATENT DOCUMENTS

| | | | |
|---|---|---|---|
| 2009/0168874 A1 | 7/2009 | Su et al. | |
| 2009/0238269 A1* | 9/2009 | Pandit | H04N 19/597 375/240.12 |
| 2009/0262804 A1* | 10/2009 | Pandit | H04N 19/597 375/240.12 |
| 2010/0046619 A1* | 2/2010 | Koo | H04N 19/597 375/240.12 |
| 2010/0091845 A1* | 4/2010 | Jeon | H04N 19/597 375/240.12 |
| 2010/0118933 A1* | 5/2010 | Pandit | H04N 19/597 375/240.01 |
| 2010/0202521 A1* | 8/2010 | Koo | H04N 19/597 375/240.13 |
| 2011/0096835 A1 | 4/2011 | Lim et al. | |
| 2012/0069903 A1* | 3/2012 | Lim | H04N 13/0066 375/240.12 |
| 2012/0106634 A1* | 5/2012 | Jeon | H04N 19/597 375/240.12 |
| 2013/0114705 A1* | 5/2013 | Chen | H04N 19/00569 375/240.12 |
| 2013/0155184 A1* | 6/2013 | Chen | H04N 19/00569 348/43 |
| 2013/0202035 A1* | 8/2013 | Chen | H04N 19/105 375/240.12 |
| 2013/0242048 A1 | 9/2013 | Yin et al. | |
| 2014/0003521 A1* | 1/2014 | Lee | H04N 19/00721 375/240.15 |

FOREIGN PATENT DOCUMENTS

| | | |
|---|---|---|
| JP | 2012-028960 | 2/2012 |
| WO | 2007/081926 | 7/2007 |
| WO | 2010/109904 | 9/2010 |

OTHER PUBLICATIONS

J. Lim et al., "Reference picture list modification process for MVC stereo high profile", 31. JVT Meeting; 89. MPEG Meeting; Jun. 28, 2009-Jul. 3, 2009; London,; (Joint Video Team of ISO/IEC JTC1/SC29/WG11 and ITU-T SG.16), No. JVT-AE018, Jun. 26, 2009 (Jun. 26, 2009), XP030007480, ISSN: 0000-0078.

J. Huo et al.: "A Flexible Reference Picture Selection Method for Spatial DIRECT Mode in Multiview Video Coding", Image and Signal Processing, 2008. CISP '08. Congress on, IEEE, Piscataway, NJ, USA, May 27, 2008 (May 27, 2008), pp. 268-272, XP031286560, ISBN: 978-0-7695-3119-9.

I. G. Richardson: "frame and picture management", Internet Citation, 2004, XP002435299, Retrieved from the Internet: URL:http://www.rgu.ac.uk/files/avc_picmanagement draft1.pdf—[retrieved on May 29, 2007].

T. Sugio et al.: "AHG15: Modification on picture marking process", 100. MPEG Meeting; Apr. 30, 2012-May 4, 2012; Geneva; (Motion Picture Expert Group or ISO/IEC JTC1/SC29/WG11),, No. m24374, Apr. 30, 2012 (Apr. 30, 2012), XP030052719.

International Search Report issued May 14, 2013 in International (PCT) Application No. PCT/JP2013/000856.

ITU-T Recommendation H.264 "Advanced video coding for generic audiovisual services", Mar. 2010.

Marek Domanski et al., "Multiview HEVC—experimental results", Joint Collaborative Team on Video Coding (JCT-VC) of ITU-T SG16 WP3 and ISO/IEC JTC1/SC29/WG11 JCTVC-G582_r2, ITU-T, Nov. 18, 2011, p. 1-6.

* cited by examiner

FIG. 5

| Motion-vector-predictor index in first prediction direction | Motion-vector-predictor candidate in first prediction direction |
|---|---|
| 0 | Neighboring block A (MvL0_A, RefL0) |
| 1 | Neighboring block B (sMvL0_B, RefL0) |
| 2 | Co-located block (MvL0_Col, RefL0) |

Number of motion-vector-predictor candidates
in first prediction direction = 3

FIG. 11A

| seq_parameter_set_rbsp( ) { | Descriptor |
|---|---|
|   profile_idc | u(8) |
| . . . | |
|   restricted_ref_pic_lists_flag | u(1) |
|   if( restricted_ref_pic_lists_flag ) | |
|     lists_modification_present_flag | u(1) |
| . . . | |
|   num_short_term_ref_pic_sets | ue(v) |
|   for( i = 0; i <num_short_term_ref_pic_sets; i++) | |
|     short_term_ref_pic_set( i ) | |
|   long_term_ref_pics_present_flag | u(1) |
| . . . | |
| } | |

FIG. 11B

| slice_header( ) { | Descriptor |
|---|---|
| . . . | |
|   entropy_slice_flag | u(1) |
|   if( !entropy_slice_flag ){ | |
|   . . . }else{ | |
|     pic_order_cnt_lsb | u(v) |
|     short_term_ref_pic_set_sps_flag | u(1) |
|     f( !short_term_ref_pic_set_sps_flag ) | |
|       short_term_ref_pic_set(num_short_term_ref_pic_sets ) | |
|     else | |
|       short_term_ref_pic_set_idx | u(v) |
|     f( long_term_ref_pics_present_flag ) { | |
|       num_long_term_pics | ue(v) |
|       for( i = 0; i <num_long_term_pics; i++ ) { | |
|         delta_poc_lsb_lt[ i ] | ue(v) |
|         delta_poc_msb_present_flag[ i ]) | u(1) |
|         if( delta_poc_msb_present_flag[ i ]) | |
|         delta_poc_msb_cycle_lt_minus1[ i ] | ue(v) |
|         used_by_curr_pic_l1_flag [ i ] | u(1) |
|       } | |
|     } | |
|   } | |
| . . . | |
|   if( slice_type == P? slice_type == B ) { | |
|     num_ref_idx_active_override_flag | u(1) |
|     if( num_ref_idx_active_override_flag ) { | |
|       num_ref_idx_l0_active_minus1 | ue(v) |
|       f( slice_type == B ) | |
|       num_ref_idx_l1_active_minus1 | ue(v) |
|     } | |
|   } | |
|   if( lists_modification_present_flag ) { | |
|     ref_pic_list_modification( ) | |
|     ref_pic_list_combination( ) | |
|   } | |
| } | |
| } | |

FIG. 11C

| short_term_ref_pic_set( idx ) { | Descriptor |
|---|---|
|   inter_ref_pic_set_rediction_flag | u(1) |
|   if( inter_ref_pic_set_prediction_flag ) { | |
|     delta_idx_minus1 | ue(v) |
|     delta_rps_sign | u(1) |
|     abs_delta_rps_minus1 | ue(v) |
|     for( j = 0;j <= NumDeltaPocs[ RIdx ] ;j++ ) { | |
|       used_by_curr_pic_flag[ j ] | u(1) |
|       if( !used_by_curr_pic_flag[ j ]) | |
|         use_delta_flag[ j ] | u(1) |
|     } | |
|   } | |
|   else { | |
|     num_negative_pics | ue(v) |
|     num_positive_pics | ue(v) |
|     for( i = 0; i <num_negative_pics; i++ ) { | |
|       delta_poc_s0_minus1[ i ] | ue(v) |
|       used_by_curr_pic_s0_flag[ i ] | u(1) |
|     } | |
|     for( i = 0; i <num_positive_pics;i++ ) { | |
|       delta_poc_s1_minus1[ i ] | ue(v) |
|       used_by_curr_pic_sl_flag[ i ] | u(1) |
|     } | |
|   } | |
| } | |

FIG. 11D

| ref_pic_list_modification( ) { | Descriptor |
|---|---|
| if( slice_type == P || slice_type == B ) { | |
| ref_pic_list_modification_flag_l0 | u(1) |
| if( ref_pic_list_modification_flag_l0 && NumPocTotalCurr > 1 ) | |
| for( i =0;i<=num_ref_idx_l0_active_minus1; i++ ) | |
| list_entry_l0[ i ] | u(v) |
| } | |
| if( slice_type == B ) { | |
| ref_pic_list_modification_flag_l1 | u(1) |
| if( ref_pic_list_modification_flag_l1 && NumPocTotalCurr > 1 ) | |
| for( i =0;i<=num_ref_idx_l1_active_minus1; i++ ) | |
| list_entry_l1[ i ] | u(v) |
| } | |
| } | |

FIG. 12A

```
cIdx = 0
while( cIdx < NumRpsCurrTempList0 ){
    for( i = 0; i < NumRpsCurrTempListBefore && cIdx < NumRpsCurrTempList0; cIdx++, i++ )
        RefPicListTemp0[ cIdx ] = RefPicSetStCurrBefore[ i ]
    for( i = 0; i < NumRpsCurrTempListAfter && cIdx < NumRpsCurrTempList0; cIdx++, i++ )
        RefPicListTemp0[ cIdx ] = RefPicSetStCurrAfter[ i ]
    for( i = 0; i < NumPocLtCurr && cIdx < NumRpsCurrTempList0; cIdx++, i++ )
        RefPicListTemp0[ cIdx ] = RefPicSetLtCurr [ i ]
}
```

FIG. 12B

```
for( cIdx = 0; cIdx . num_ref_idx_l0_active_minus1; cIdx++)
    RefPicList0[ cIdx ] = ref_pic_list_modification_flag_l0 ?
        RefPicListTemp0[ list_entry_l0[ cIdx] ] : RefPicListTemp0[ cIdx ]
```

FIG. 12C

```
cIdx = 0
while( cIdx < NumRpsCurrTempList1 ) {
    for( i = 0; i < NumPocStCurrAfter && cIdx < NumRpsCurrTempList1; cIdx++, i++ )
        RefPicListTemp1[ cIdx ] = RefPicSetStCurrAfter[ i ]
    for( i = 0; i < NumPocStCurrBefore && cIdx < NumRpsCurrTempList1; cIdx++, i++ )
        RefPicListTemp1[ cIdx ] = RefPicSetStCurrBefore[ i ]
    for( i =0; i < NumPocLtCurr && cIdx < NumRpsCurrTempList1; cIdx++, i++ )
        RefPicListTemp1[ cIdx ] = RefPicSetLtCurr [ i ]
}
```

FIG. 12D

```
for( cIdx = 0; cIdx . num_ref_idx_l1_active_minus1; cIdx++)
    RefPicList1[ cIdx ] = ref_pic_list_modification_flag_l1 ?
        RefPicListTemp1[ list_entry_l1[ cIdx] ] : RefPicListTemp1[ cIdx ]
```

FIG. 29

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 40
| Corresponding standard | Driving frequency |
|---|---|
| MPEG-4 AVC | 500 MHz |
| MPEG-2 | 350 MHz |
| ⋮ | ⋮ |
FIG. 41A
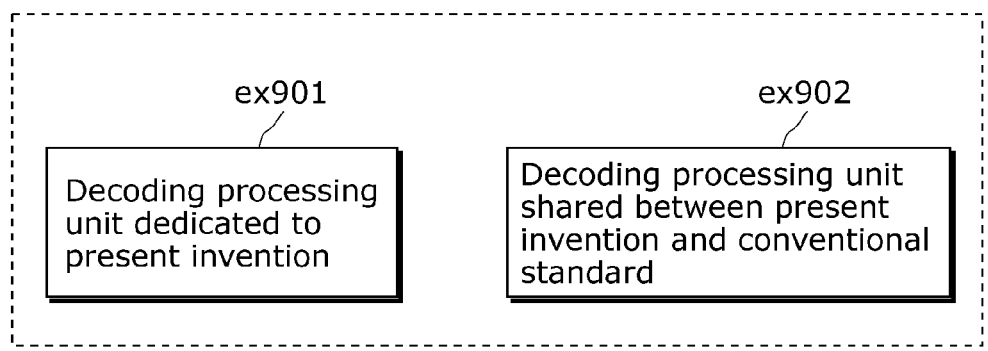
FIG. 41B
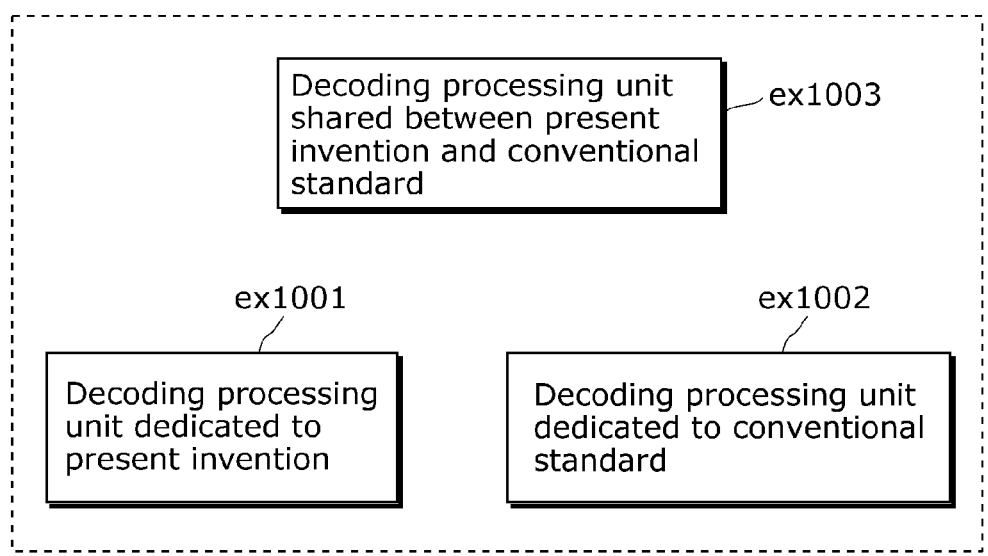

IMAGE ENCODING METHOD, IMAGE DECODING METHOD, IMAGE ENCODING APPARATUS, IMAGE DECODING APPARATUS, AND IMAGE CODING APPARATUS

TECHNICAL FIELD

The present invention relates to an image encoding method of encoding a picture on a block-by-block basis.

BACKGROUND ART

A technology related to an image encoding method of encoding a picture on a block-by-block basis is described in Non Patent Literature (NPL) 1.

CITATION LIST

Non Patent Literature

[NPL 1]
ITU-T Recommendation H.264 "Advanced video coding for generic audiovisual services", March 2010.

SUMMARY OF INVENTION

Technical Problem

However, in recent years, broadcasting and content distribution of high-definition images (4K×2K) have been studied. On this account, a higher encoding efficiency is expected.

In view of this, the present invention provides an image encoding method capable of increasing the encoding efficiency in image encoding.

Solution to Problem

An image encoding method according to an aspect of the present invention is an image encoding method of encoding a current picture on a block-by-block basis, the image encoding method including: generating a reference picture list by (i) assigning a reference picture index to a reference picture referable for encoding the current picture and (ii) including the reference picture assigned the reference picture index into the reference picture list; and encoding a current block included in the current picture with reference to a reference picture that is specified, from the reference picture list, for encoding the current block, wherein, when a reference picture belonging to a reference view different from a current view to which the current picture belongs has a chance of being referenced for encoding the current picture, the reference picture belonging to the reference view is added to the reference picture list in the generating.

These general and specific aspects may be implemented using a system, an apparatus, an integrated circuit, a computer program, or a computer-readable recording medium such as a CD-ROM, or any combination of systems, apparatuses, methods, integrated circuits, computer programs, or recording media.

Advantageous Effects of Invention

The image encoding method according to an aspect of the present invention can increase the encoding efficiency in image encoding.

BRIEF DESCRIPTION OF DRAWINGS

FIG. 5 is a diagram showing motion-vector-predictor candidates in Embodiment 1.

FIG. 11A is a diagram showing a syntax of a sequence parameter set in Embodiment 1.

FIG. 11B is a diagram showing a syntax of a slice header in Embodiment 1.

FIG. 11C is a diagram showing a syntax for specifying a short term picture in Embodiment 1.

FIG. 11D is a diagram showing a syntax for modifying a reference picture list in Embodiment 1.

FIG. 12A is a diagram showing processing of temporary addition performed on the reference picture list of the first prediction direction in Embodiment 1.

FIG. 12B is a diagram showing processing of final addition performed on the reference picture list of the first prediction direction in Embodiment 1.

FIG. 12C is a diagram showing processing of temporary addition performed on the reference picture list of the second prediction direction in Embodiment 1.

FIG. 12D is a diagram showing processing of final addition performed on the reference picture list of the second prediction direction in Embodiment 1.

FIG. 29 illustrates a structure of multiplexed data.

FIG. 40 shows an example of a look-up table in which video data standards are associated with driving frequencies.

FIG. 41A is a diagram showing an example of a configuration for sharing a module of a signal processing unit.

FIG. 41B is a diagram showing another example of a configuration for sharing a module of the signal processing unit.

DESCRIPTION OF EMBODIMENTS

Figure 1:
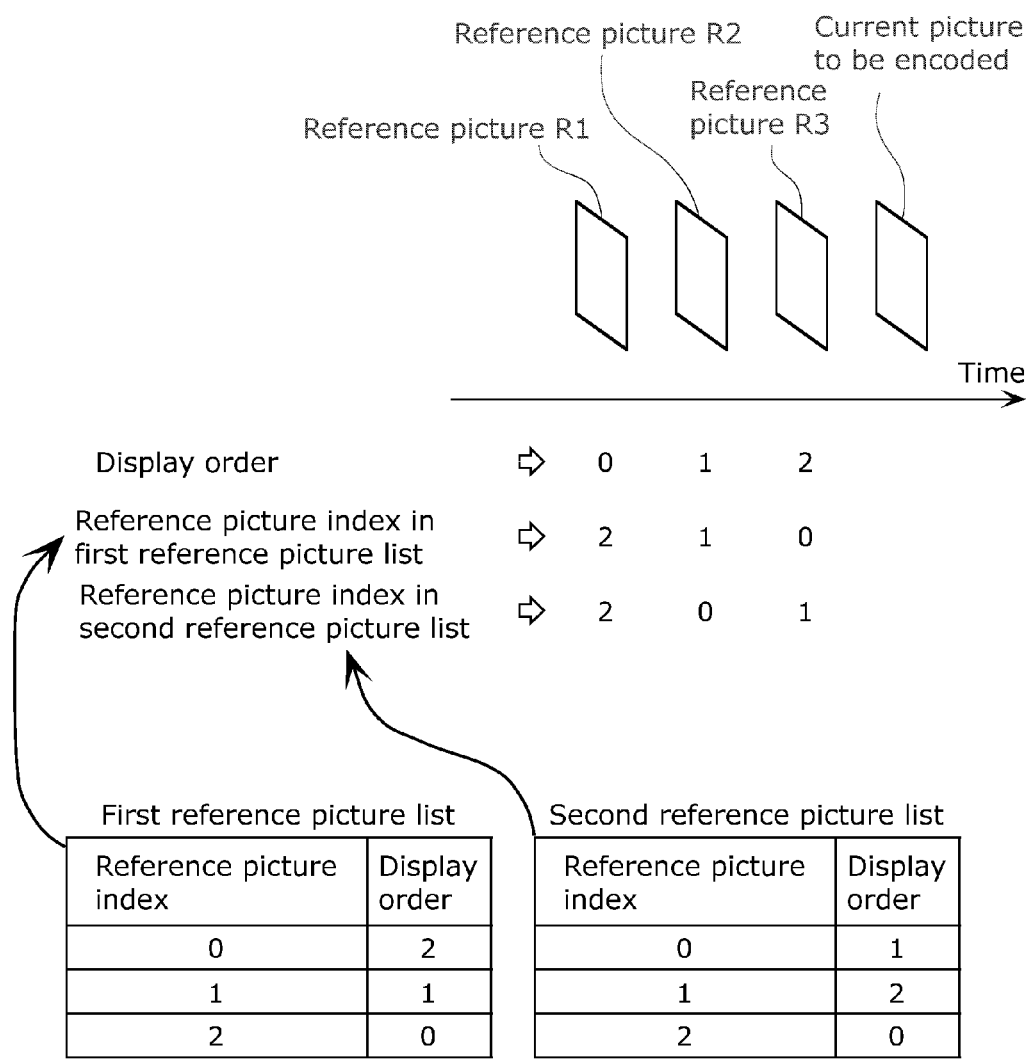
FIG. 1 is a diagram showing an example of a reference picture list.

Underlying Knowledge Forming Basis of the Present Invention

The present inventors found out a problem related to an image encoding method of encoding a picture on a block-by-block basis. The following is a specific description.

In general, in image encoding, the amount of information is compressed based on redundancies of images in the spatial direction and in the time direction. As a method of using the redundancy in the spatial direction, transform into the frequency domain is employed. As a method of using the redundancy in the time direction, inter-picture prediction (referred to as "inter-prediction" hereafter) encoding is employed.

When encoding a picture that is to be encoded (i.e., a current picture) according to inter-prediction encoding, an image encoding apparatus uses, as a reference picture, a picture that has been already encoded and precedes or follows the current picture in display time order. Then, the image encoding apparatus derives a motion vector by estimating motion of the current picture with respect to the reference picture.

After this, the image encoding apparatus removes the redundancy in the time direction by obtaining a difference between prediction image data obtained by motion compensation performed based on the motion vector and image data of the current picture.

Moreover, in motion estimation, the image encoding apparatus calculates values of difference between a block to be encoded (i.e., a current block) in the current picture and blocks in the reference picture and specifies, as a reference block, the block having the smallest value of difference in the reference picture. Then, the image encoding apparatus estimates a motion vector using the current block and the reference block.

The image encoding method called "H.264" has already been standardized (Non Patent Literature 1). According to this image encoding method, three kinds of pictures which are "I picture", "P picture", and "B picture" are used for compressing the amount of information.

I picture refers to a picture on which inter-prediction encoding is not performed, or more specifically, intra-picture prediction (referred to as "intra-prediction" hereafter) encoding is performed. P picture refers to a picture on which inter-prediction encoding is performed whereby one encoded picture that precedes or follows the current picture in display time order is referenced. B picture refers to a picture on which inter-prediction encoding is performed whereby two encoded pictures that precede or follow the current picture in display time order are referenced.

The image encoding apparatus generates a reference picture list for specifying a reference picture in inter-prediction encoding. The reference picture list refers to a list in which a reference picture index is assigned to a reference picture that has been encoded and is to be referenced in inter-prediction. For example, since B picture is encoded with reference to two pictures, the image encoding apparatus holds two reference picture lists (L0 and L1).

FIG. 1 shows examples of the reference picture lists for B picture. In FIG. 1, a first reference picture list (L0) is an example of a reference picture list of a first prediction direction in bidirectional prediction. A reference picture R3 which is "2" in display order is assigned to a reference picture index "0". A reference picture R2 which is "1" in display order is assigned to a reference picture index "1". A reference picture R1 which is "0" in display order is assigned to a reference picture index "2".

To be more specific, a smaller reference picture index is assigned to a picture that is temporally closer, in display order, to the current picture.

On the other hand, a second reference picture list (L1) is an example of a reference picture list of a second prediction direction in bidirectional prediction. A reference picture R2 which is "1" in display order is assigned to a reference picture index "0". A reference picture R3 which is "2" in display order is assigned to a reference picture index "1". A reference picture R1 which is "0" in display order is assigned to a reference picture index "2".

In this way, different reference picture indexes may be assigned to one reference picture in the two reference picture lists corresponding to the two prediction directions (such as the reference pictures R2 and R3 in FIG. 1). Moreover, the same reference picture index may be assigned to one reference picture in the two reference picture lists (such as the reference picture R1 in FIG. 1). In regard to this reference picture list, a new calculation method is presently being studied.

However, the calculation method presently being studied does not consider that the current picture is encoded with reference to a picture belonging to a different view or a different layer. For example, an image encoding apparatus relating to multiview video coding (MVC) may encode a picture in a non-base view with reference to a picture in a base view. The calculation method presently being studied does not take such encoding into consideration.

In view of this, an image encoding method according to an aspect of the present invention is an image encoding method of encoding a current picture on a block-by-block basis, the image encoding method including: generating a reference picture list by (i) assigning a reference picture index to a reference picture referable for encoding the current picture and (ii) including the reference picture assigned the reference picture index into the reference picture list; and encoding a current block included in the current picture with reference to a reference picture that is specified, from the reference picture list, for encoding the current block, wherein, when a reference picture belonging to a reference view different from a current view to which the current picture belongs has a chance of being referenced for encoding the current picture, the reference picture belonging to the reference view is added to the reference picture list in the generating.

With this, when inter-view prediction can be performed, the reference picture used for inter-view prediction is added to the reference picture list. Therefore, a more appropriate reference picture can be selected from the reference picture list. Hence, the encoding efficiency is increased.

For example, the reference picture list may be generated using a parameter in the generating, and the parameter used for generating the reference picture list may be further encoded in the encoding.

With this, in both encoding and decoding, the same reference picture list can be generated using the same parameter. Therefore, the reference picture list can be changed with flexibility. Hence, appropriate encoding can be performed.

Moreover, for example, in the generating, when the reference picture belonging to the reference view has the chance of being referenced for encoding the current picture, (i) a third number indicating a total number of reference pictures referable for encoding the current picture may be calculated by adding a first number to a second number, the first number indicating a total number of referable reference pictures belonging to the current view, and the second number indicating a total number of referable reference pictures belonging to the reference view, and (ii) a range of a value in a modification list used for modifying the reference picture index assigned to the reference picture included in the reference picture list may be determined based on the third number.

With this, the reference picture index can be modified within an appropriate range corresponding to the number of referable reference pictures.

Furthermore, for example, in the generating, whether or not the reference picture belonging to the reference view has the chance of being referenced for encoding the current picture may be further determined based on whether or not the current view is a non-base view.

With this, it is appropriately determined whether or not the reference picture included in the view different from the view including the current picture is referable.

Moreover, for example, in the generating, whether or not the current view is the non-base view may be determined based on a view order index assigned to the current view in encoding order.

With this, it is appropriately determined whether or not the view including the current picture is a non-base view.

Furthermore, an image decoding method according to an aspect of the present invention is an image decoding method of decoding a current picture on a block-by-block basis, the image decoding method including: generating a reference picture list by (i) assigning a reference picture index to a reference picture referable for decoding the current picture and (ii) including the reference picture assigned the reference picture index into the reference picture list; and decoding a current block included in the current picture with reference to a reference picture that is specified, from the reference picture list, for decoding the current block, wherein, when a reference picture belonging to a reference view different from a current view to which the current picture belongs has a chance of being referenced for decoding the current picture, the reference picture belonging to the reference view is added to the reference picture list in the generating.

With this, when inter-view prediction can be performed, the reference picture for the inter-view prediction is added to the reference picture list. Therefore, a more appropriate reference picture can be selected from the reference picture list. Hence, decoding corresponding to highly-efficient encoding can be implemented.

For example, a parameter used for generating the reference picture list may be further decoded in the decoding, and the reference picture list may be generated using the decoded parameter in the generating.

With this, in both encoding and decoding, the same reference picture list can be generated using the same parameter. Therefore, the reference picture list can be changed with flexibility. Hence, appropriate decoding can be performed.

Moreover, for example, in the generating, when the reference picture belonging to the reference view has the chance of being referenced for decoding the current picture, (i) a third number indicating a total number of reference pictures referable for decoding the current picture may be calculated by adding a first number to a second number, the first number indicating a total number of referable reference pictures belonging to the current view, and the second number indicating a total number of referable reference pictures belonging to the reference view, and (ii) a range of a value in a modification list used for modifying the reference picture index assigned to the reference picture included in the reference picture list may be determined based on the third number.

With this, the reference picture index can be modified within an appropriate range corresponding to the number of referable reference pictures.

Furthermore, for example, in the generating, whether or not the reference picture belonging to the reference view has the chance of being referenced for decoding the current picture may be further determined based on whether or not the current view is a non-base view.

With this, it is appropriately determined whether or not the reference picture included in the view different from the view including the current picture is referable.

Moreover, for example, in the generating, whether or not the current view is the non-base view may be determined based on a view order index assigned to the current view in decoding order.

With this, it is appropriately determined whether or not the view including the current picture is a non-base view.

These general and specific aspects may be implemented using a system, an apparatus, an integrated circuit, a computer program, or a computer-readable recording medium such as a CD-ROM, or any combination of systems, apparatuses, methods, integrated circuits, computer programs, or recording media.

Hereafter, exemplary embodiments according to the present invention are described with reference to the drawings. Each of the embodiments described below shows a general or specific example. The numerical values, shapes, materials, structural elements, the arrangement and connection of the structural elements, steps, the processing order of the steps etc. shown in the following exemplary embodiments are meter examples, and therefore do not limit the scope of the appended Claims and their equivalents. Therefore, among the structural elements in the following exemplary embodiments, structural elements not recited in any one of the independent claims are described as arbitrary structural elements.

Embodiment 1

Figure 2:
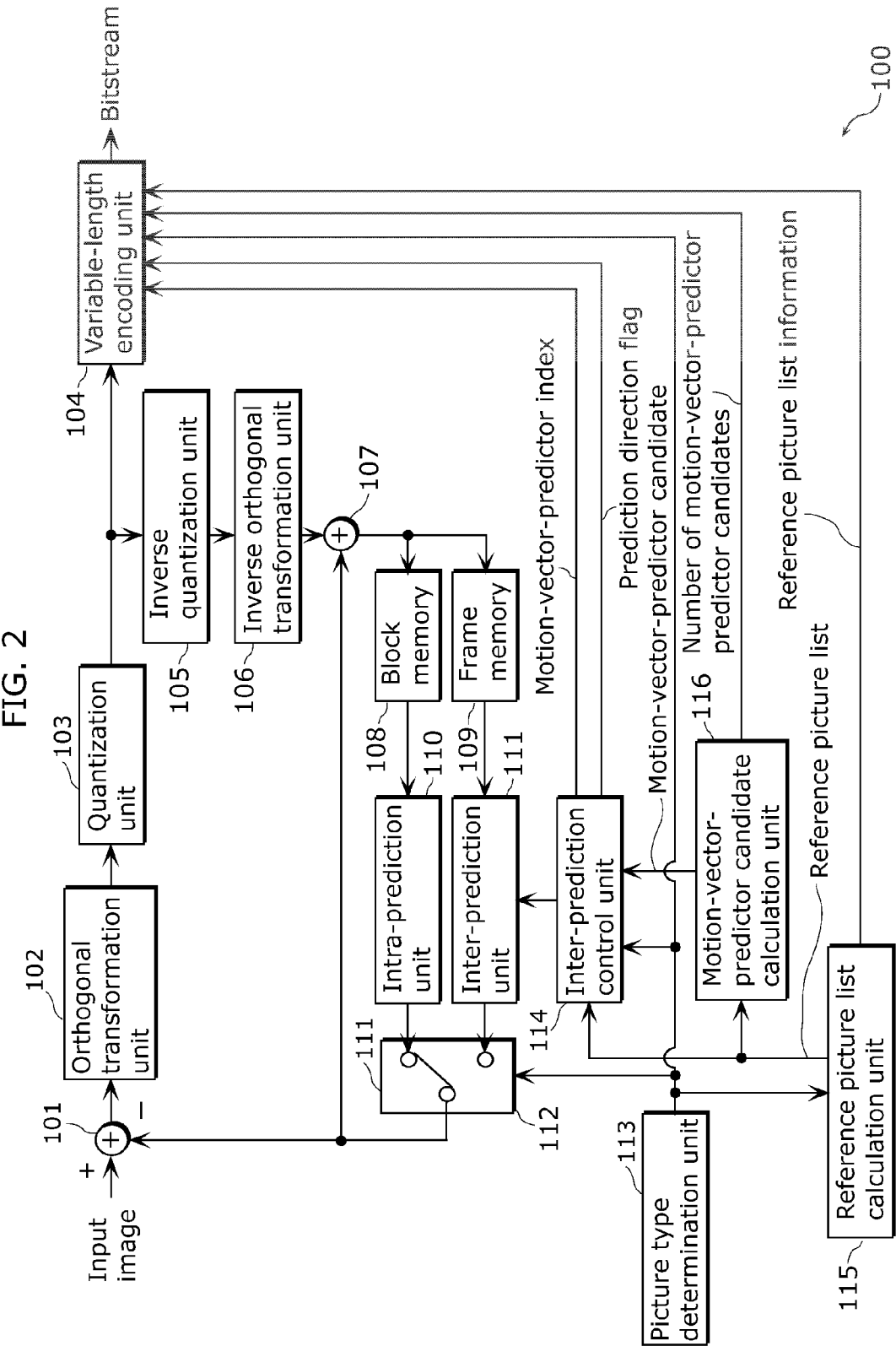
FIG. 2 is a block diagram showing a configuration of an image encoding apparatus in Embodiment 1.

FIG. 2 is a block diagram showing a configuration of an image encoding apparatus in the present embodiment. As shown in FIG. 2, an image encoding apparatus 100 includes a subtraction unit 101, an orthogonal transformation unit 102, a quantization unit 103, an inverse quantization unit 105, an inverse orthogonal transformation unit 106, an addition unit 107, a block memory 108, a frame memory 109, an intra-prediction unit 110, an inter-prediction unit 111, a switching unit 112, an inter-prediction control unit 114, a reference picture list calculation unit 115, a picture type determination unit 113, a motion-vector-predictor candidate calculation unit 116, and a variable-length encoding unit 104.

The orthogonal transformation unit 102 transforms an input image from the pixel domain into the frequency domain. The quantization unit 103 performs quantization on the input image transformed into the frequency domain. The inverse quantization unit 105 performs inverse quantization on the input image quantized by the quantization unit 103. The inverse orthogonal transformation unit 106 transforms the inversely-quantized input image from the frequency domain into the pixel domain.

The block memory 108 stores the input image on a block-by-block basis. The frame memory 109 stores the input image on a frame-by-frame basis. The picture type determination unit 113 determines a picture type of the input image, i.e., I picture, B picture, or P picture, for encoding the input image, and then generates picture type information.

The intra-prediction unit 110 generates prediction image data, by encoding a current block to be encoded according to intra-prediction using the input image stored in the block memory 108 on the block-by-block basis. The inter-prediction unit 111 generates image prediction image, by encoding the current block according to inter-prediction using the input image stored in the frame memory 109 on the frame-by-frame basis and a motion vector derived through, for example, motion estimation.

The motion-vector-predictor candidate calculation unit 116 derives a motion-vector-predictor candidate in a motion-vector-predictor specification mode. The motion-vector-predictor candidate is derived using a neighboring block of the current block and "colPic" information including a motion vector of a co-located block included in a picture that has been already encoded. The motion-vector-predictor candidate in the motion-vector-predictor specification mode refers to a candidate of the motion vector predictor to be used in encoding the motion vector. Then, the motion-vector-predictor candidate calculation unit 116 calculates the number of motion-vector-predictor candidates.

Moreover, the motion-vector-predictor candidate calculation unit 116 assigns a value of a motion-vector-predictor index to the derived motion-vector-predictor candidate. After this, the motion-vector-predictor candidate calculation unit 116 transmits the motion-vector-predictor candidate and the motion-vector-predictor index to the inter-prediction control unit 114. Furthermore, the motion-vector-predictor candidate calculation unit 116 transmits the calculated number of motion-vector-predictor candidates to the variable-length encoding unit 104.

Together with the inter-prediction unit 111, the inter-prediction control unit 114 generates inter-prediction image using the motion vector derived by motion estimation. Moreover, together with the inter-prediction unit 111, the inter-prediction control unit 114 performs inter-prediction encoding using the inter-prediction image.

Furthermore, the inter-prediction control unit 114 selects the most appropriate motion-vector-predictor candidate for encoding the motion vector used in inter-prediction encoding, according to a method described later. Then, the inter-prediction control unit 114 transmits, to the variable-length encoding unit 104, the motion-vector-predictor index corresponding to the selected motion-vector-predictor candidate and prediction error information.

The reference picture list calculation unit 115 calculates a reference picture list used for encoding the current picture or slice, according to a method described later. Then, the reference picture list calculation unit 115 outputs the reference picture list to the inter-prediction control unit 114 and the motion-vector-predictor candidate calculation unit 116. Next, the reference picture list calculation unit 115 outputs, to the variable-length encoding unit 104, a parameter for calculating the reference picture list used in encoding, as reference picture list information.

The orthogonal transformation unit 102 transforms the prediction error data obtained between the generated prediction image data and the input image data, from the pixel domain into the frequency domain. The quantization unit 103 performs quantization on the prediction error data transformed into the frequency domain.

The variable-length encoding unit 104 generates a bitstream by performing variable-length encoding on the quantized prediction error data, a prediction direction flag, the picture type information, and the reference picture list information. Moreover, the variable-length encoding unit 104 sets the number of the motion-vector-predictor candidates as the size of the motion-vector-predictor candidate list. Then, the variable-length encoding unit 104 performs variable-length encoding while assigning a bit string determined according to the size of the motion-vector-predictor candidate list to the motion-vector-predictor index used in encoding the motion vector.

Figure 3:
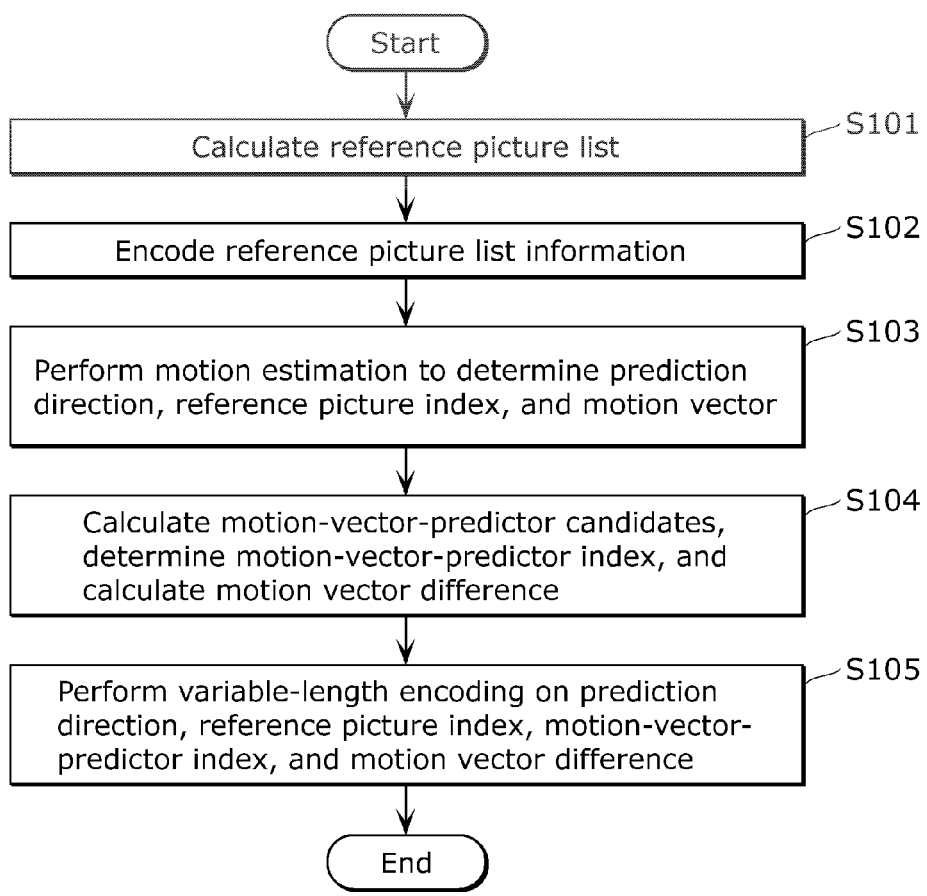
FIG. 3 is a flowchart showing an operation of the image encoding apparatus in Embodiment 1.

FIG. 3 is a general processing flow of an image encoding method in the present embodiment. Firstly, the reference picture list calculation unit 115 calculates the reference picture list for the current picture or slice, according to a method described later (S101).

The variable-length encoding unit 104 encodes the reference picture list information and adds the encoded reference picture list information to a header. To be more specific, the variable-length encoding unit 104 adds, as the reference picture list information, the parameter used for calculating the reference picture list, to a sequence parameter set (SPS), picture parameter set (PPS), a slice header, or the like (S102).

The inter-prediction control unit 114 performs motion estimation to determine the prediction direction, the reference picture index, and the motion vector for the current block (S103). In motion estimation, the inter-prediction control unit 114 calculates, for example, values of difference between the current block in the current picture and the blocks in the reference picture. Then, the inter-prediction control unit 114 determines, as the reference block, the block having the smallest value of difference in the reference picture. After this, the inter-prediction control unit 114 uses, for example, a method of calculating the motion vector from the position of the current block and the position of the reference block.

Moreover, the inter-prediction control unit 114 performs motion estimation for each of a reference picture of a first prediction direction and a reference picture of a second prediction direction. Then, the inter-prediction control unit 114 selects the first prediction direction, the second prediction direction, or bi-prediction, according to, for example, Equation 1 indicating an R-D optimization model.

$$\text{Cost} = D + \lambda * R \quad \text{(Equation 1)}$$

In Equation 1, "D" represents encoding distortion. For example, D is indicated by a sum of absolute difference values each between a pixel value obtained by encoding or decoding the current block using the prediction image generated based on a certain vector and the original pixel value of the current block. Moreover, "R" represents the amount of generated encoded data and is indicated by, for example, the amount of encoded data generated by encoding the motion vector used in generating the prediction image. Furthermore, "$\lambda$" represents a Lagrange undetermined multiplier.

Figure 4:
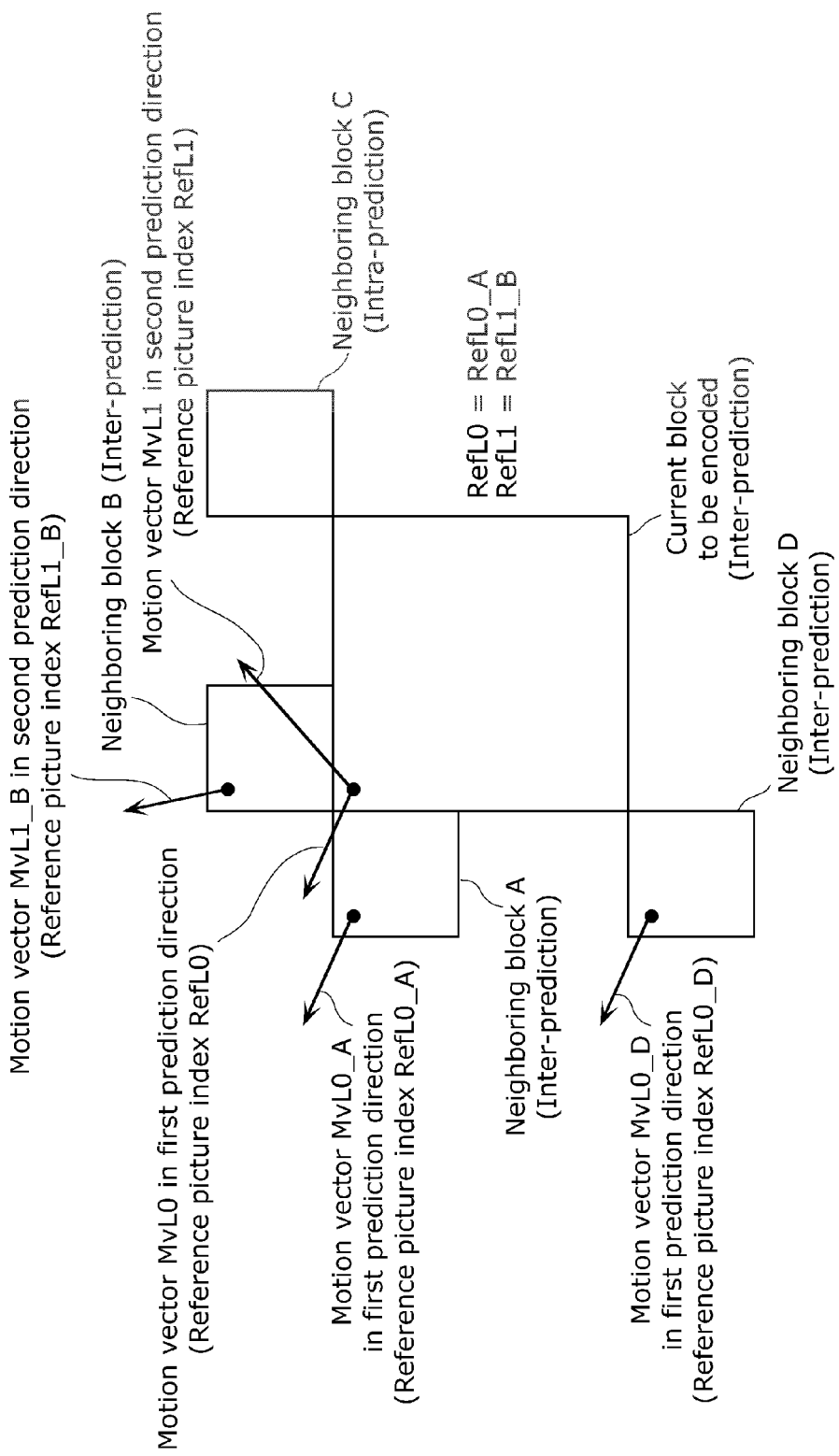
FIG. 4 is a diagram showing examples of neighboring blocks in Embodiment 1.
Figure 6:
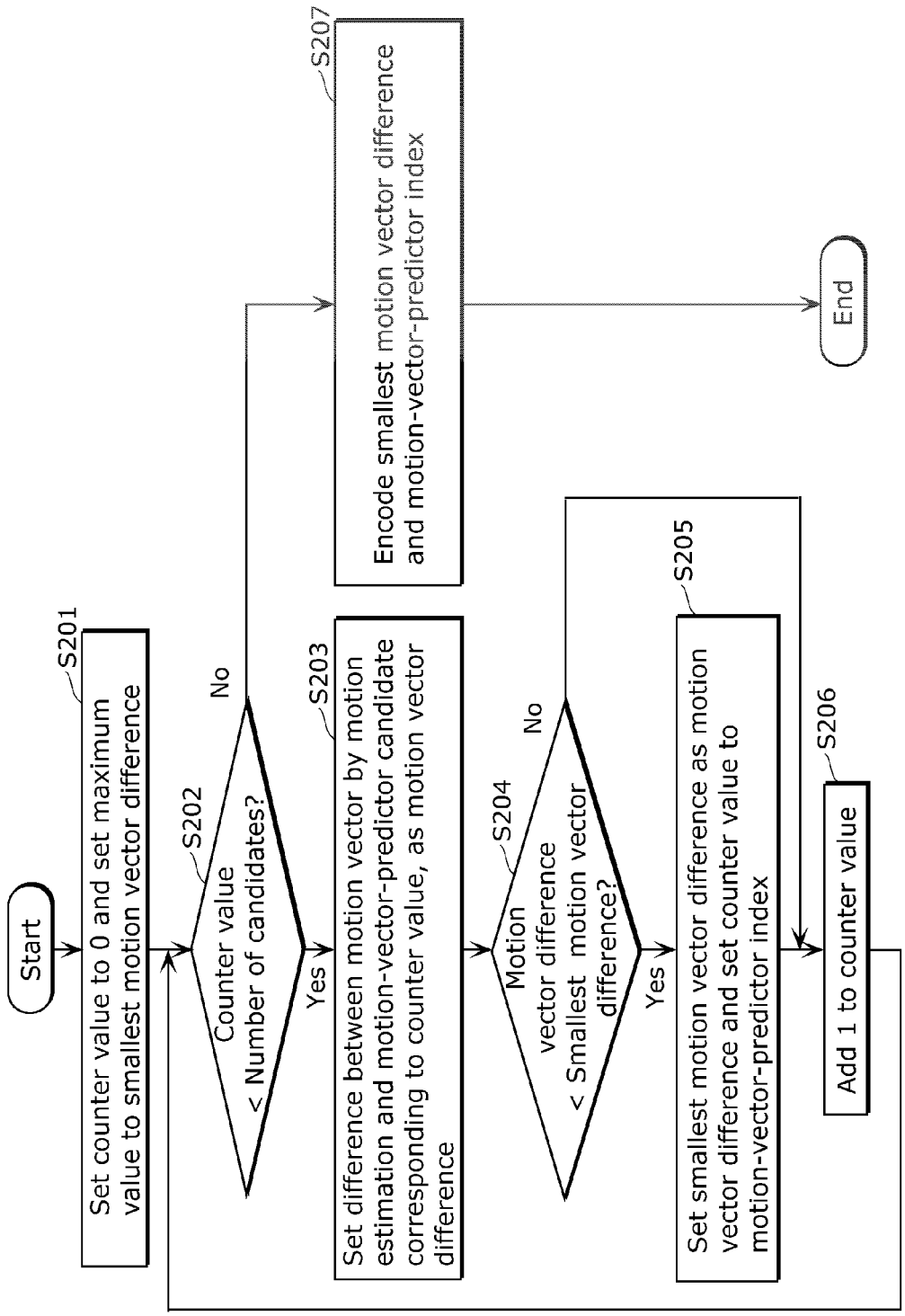
FIG. 6 is a flowchart showing processing of determining a motion-vector-predictor index in Embodiment 1.

The motion-vector-predictor candidate calculation unit 116 generates the motion-vector-predictor candidates as shown in FIG. 5, from the neighboring blocks and co-located blocks of the current block as shown in FIG. 4. Then, according to the flow as shown in FIG. 6, the inter-prediction control unit 114 determines the motion-vector-predictor index that is the index of the motion vector predictor used for encoding the motion vector, and calculates the motion vector difference (S104). Here, the motion vector difference refers to a difference between the motion vector and the motion vector predictor.

The variable-length encoding unit 104 performs variable-length encoding on the prediction direction, the reference picture index, the motion-vector-predictor index, and the motion vector difference (S105).

The present embodiment firstly describes a method of calculating the reference picture list in the case where the image encoding apparatus 100 encodes the current picture without reference to a picture in a different view. This method is used, for example, for encoding a sequence including only a base view.

Figure 7:
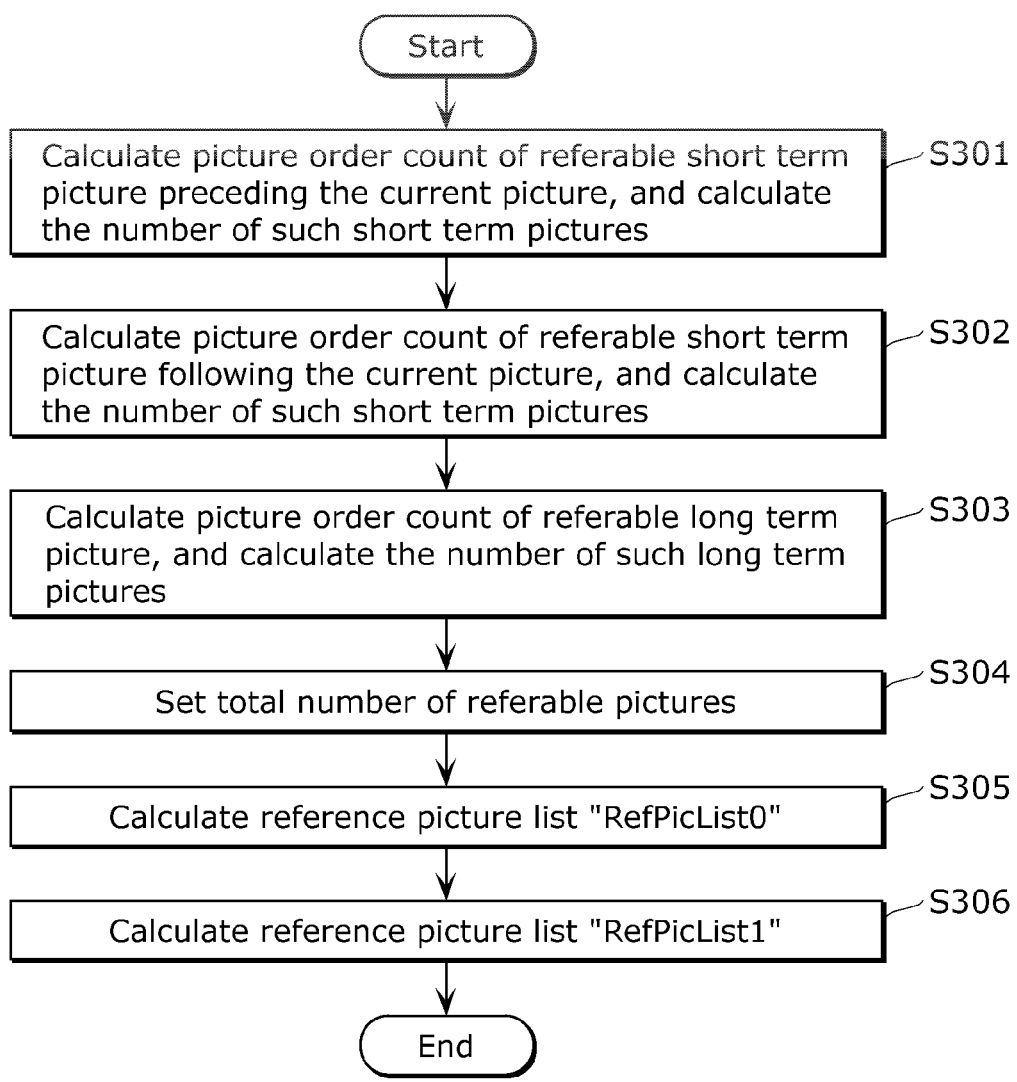
FIG. 7 is a flowchart showing processing of calculating a reference picture list in Example 1 according to Embodiment 1.

FIG. 7 is a detailed processing flow of S101 shown in FIG. 3, and shows a method of calculating the reference picture list in the case where a picture in a different view is not referenced. The following explains the method shown in FIG. 7.

The reference picture list calculation unit 115 calculates: a picture order count (POC) of a short term picture that precedes the current picture in the picture order count and is referable in inter-prediction; and the number of such short term pictures (NumPocStCurrBefore) (S301).

Next, the reference picture list calculation unit 115 calculates: a POC of a short term picture that follows the current picture in the picture order count and is referable in inter-prediction; and the number of such short term pictures (NumPocStCurrAfter) (S302).

After this, the reference picture list calculation unit 115 calculates: a POC of a long term picture that is referable in inter-prediction; and the number of such long term pictures (NumPocLtCurr) (S303).

Then, the reference picture list calculation unit 115 calculates a total number of reference pictures (NumPocTotalCurr) that are referable in inter-prediction by adding NumPocStCurrBefore, NumPocStCurrAfter, and NumPocLtCurr together (S304).

Next, the reference picture list calculation unit 115 calculates a reference picture list "RefPicList0" of the first prediction direction, according to a method described later (S305). Then, the reference picture list calculation unit 115 calculates a reference picture list "RefPicList1" of the second prediction direction (S306).

Figure 8:
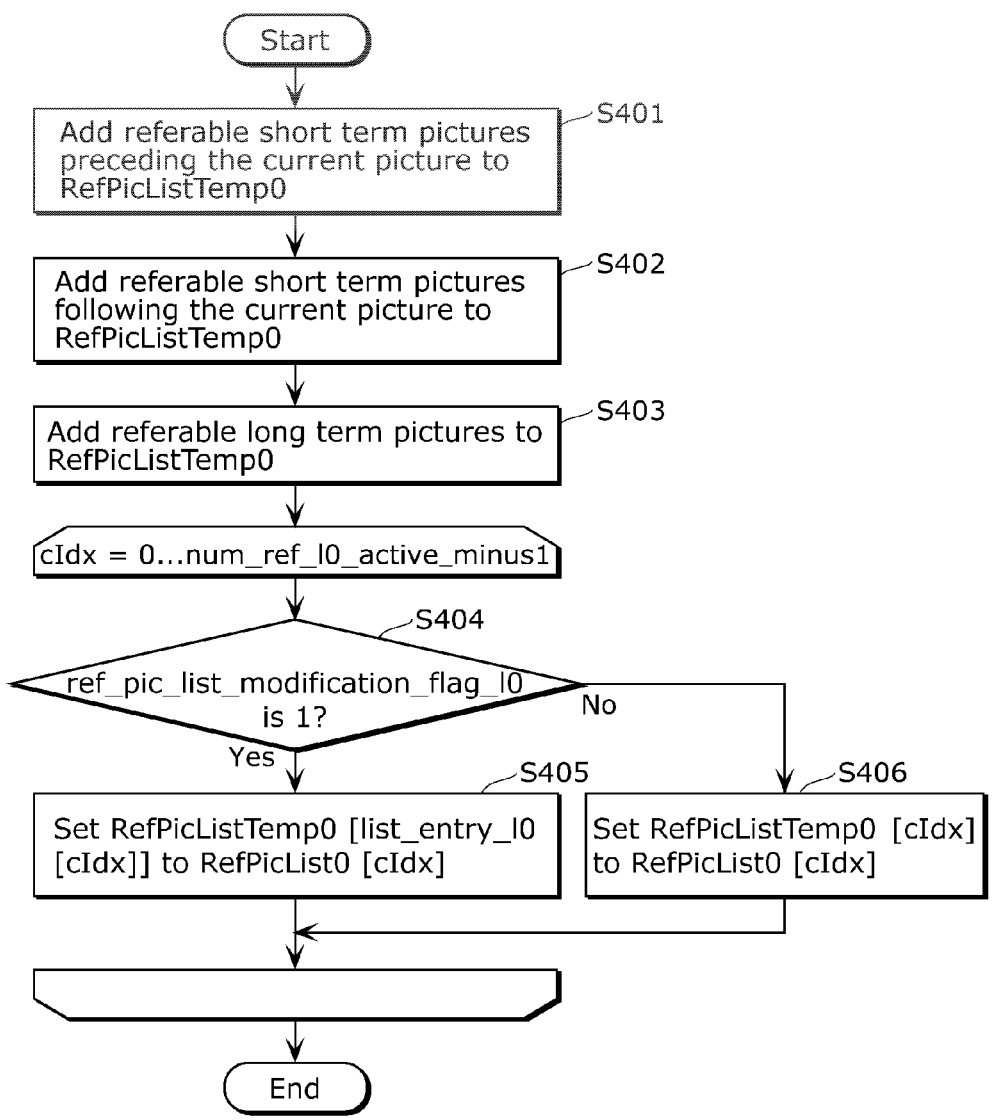
FIG. 8 is a flowchart showing processing of calculating a reference picture list of a first prediction direction in Example 1 according to Embodiment 1.

FIG. 8 is a detailed processing flow of S305 shown in FIG. 7 and shows a method of calculating the reference picture list RefPicList0 of the first prediction direction. The following explains the method shown in FIG. 8.

Firstly, the reference picture list calculation unit 115 adds, to a reference picture list "RefPicListTemp0", the reference pictures corresponding to the POCs calculated in S301 of FIG. 7 as many as the calculated NumPocStCurrBefore (S401). Next, the reference picture list calculation unit 115 adds, to the reference picture list RefPicListTemp0, the reference pictures corresponding to the POCs calculated in S302 of FIG. 7 as many as the calculated NumPocStCurrAfter (S402).

Next, the reference picture list calculation unit 115 adds, to the reference picture list RefPicListTemp0, the reference pictures corresponding to the POCs calculated in S303 of FIG. 7 as many as the calculated NumPocLtCurr (S403).

After this, the reference picture list calculation unit 115 calculates the reference picture list RefPicList0 using the reference picture list RefPicListTemp0 obtained by performing S401 to S403. The number of reference pictures in the calculated reference picture list RefPicList0 is equal to the number of reference pictures (num_ref_l0_active_minimum1+1) that are referable in the first prediction direction from the current picture (or slice).

The reference picture list calculation unit 115 calculates the reference picture list RefPicList0 according to a value of a flag. To be more specific, the reference picture list calculation unit 115 determines whether or not a flag "ref_pic_list_modification_flag_l0" indicating whether or not the reference picture list of the first prediction direction is to be modified is 1 (S404).

When it is true (Yes in S404), the reference picture list calculation unit 115 calculates the reference picture list RefPicList0 according to the reference picture list RefPicListTemp0 and a value of "list_entry_l0 [cIdx]" ("cIdx" indicates a value from 0 to "num_ref_l0_active_minus1") (S405).

To be more specific, the reference picture list calculation unit 115 calculates the reference picture list RefPicList0 by assigning RefPicListTemp0 [list_entry_l0 [cIdx]] to RefPicList0 [cIdx].

Here, "list_entry_l0 [cIdx]" refers to a parameter (modification list) used for modifying the reference picture list of the first prediction direction. This parameter is used for assigning the cIdx-th reference picture index to the list_entry_I0 [cIdx]-th reference picture index, and is added to the slice header or the like.

It should be noted that a range of the value of list_entry_I0 [cIdx] is based on the value of NumPocTotalCurr and is limited from 0 to "NumPocTotalCurr-1" inclusive.

When it is false (No in S404), the reference picture list calculation unit 115 calculates the reference picture list RefPicList0 using the reference picture list RefPicListTemp0 (S406). To be more specific, the reference picture list calculation unit 115 calculates the reference picture list RefPicList0 by assigning RefPicListTemp0 [cIdx] to RefPicList0 [cIdx].

Figure 9:
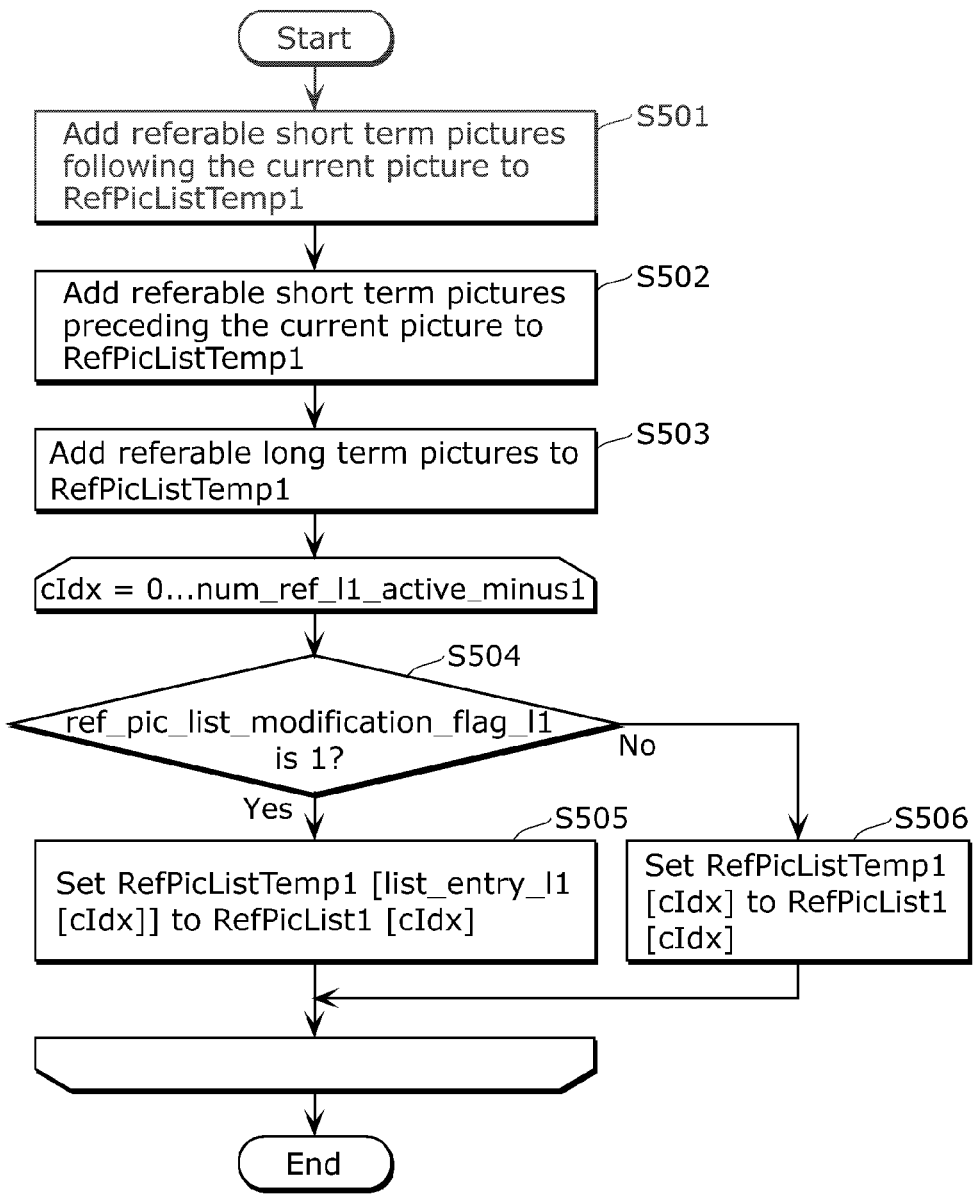
FIG. 9 is a flowchart showing processing of calculating a reference picture list of a second prediction direction in Example 1 according to Embodiment 1.

FIG. 9 is a detailed processing flow of S306 shown in FIG. 7 and shows a method of calculating the reference picture list RefPicList1 of the second prediction direction. The following explains the method shown in FIG. 9.

Firstly, the reference picture list calculation unit 115 adds, to a reference picture list "RefPicListTemp1", the reference pictures corresponding to the POCs calculated in S302 of FIG. 7 as many as the calculated NumPocStCurrAfter (S501). Next, the reference picture list calculation unit 115 adds, to the reference picture list RefPicListTemp1, the reference pictures corresponding to the POCs calculated in S301 of FIG. 7 as many as the calculated NumPocStCurrBefore (S502).

Next, the reference picture list calculation unit 115 adds, to the reference picture list RefPicListTemp1, the reference pictures corresponding to the POCs calculated in S303 of FIG. 7 as many as the calculated NumPocLtCurr (S503).

After this, the reference picture list calculation unit 115 calculates the reference picture list RefPicList1 using the reference picture list RefPicListTemp1 obtained by performing S501 to S503. The number of reference pictures in the calculated reference picture list RefPicList1 is equal to the number of reference pictures (num_ref_I1_active_minum1+1) that are referable in the second prediction direction from the current picture (or slice).

The reference picture list calculation unit 115 calculates the reference picture list RefPicList1 according to a value of a flag. To be more specific, the reference picture list calculation unit 115 determines whether or not a flag "ref_pic_list_modification_flag_11" indicating whether or not the reference picture list of the second prediction direction is to be modified is 1 (S504).

When it is true (Yes in S504), the reference picture list calculation unit 115 calculates the reference picture list RefPicList1 according to the reference picture list RefPicListTemp1 and a value of "list_entry_I1 [cIdx]" ("cIdx" indicates a value from 0 to "num_ref_I1_active_minus1") (S505).

To be more specific, the reference picture list calculation unit 115 calculates the reference picture list RefPicList1 by assigning RefPicListTemp1 [list_entry_I1 [cIdx]] to RefPicList1 [cIdx].

Here, "list_entry_I1 [cIdx]" refers to a parameter (modification list) used for modifying the reference picture list of the second prediction direction. This parameter is used for assigning the cIdx-th reference picture index to the list_entry_I1 [cIdx]-th reference picture index, and is added to the slice header or the like.

It should be noted that a range of the value of list_entry_I1 [cIdx] is based on the value of NumPocTotalCurr and is limited from 0 to "NumPocTotalCurr-1" inclusive.

When it is false (No in S504), the reference picture list calculation unit 115 calculates the reference picture list RefPicList1 using the reference picture list RefPicListTemp1 (S506). To be more specific, the reference picture list calculation unit 115 calculates the reference picture list RefPicList1 by assigning RefPicListTemp1 [cIdx] to RefPicList1 [cIdx].

Figure 10:
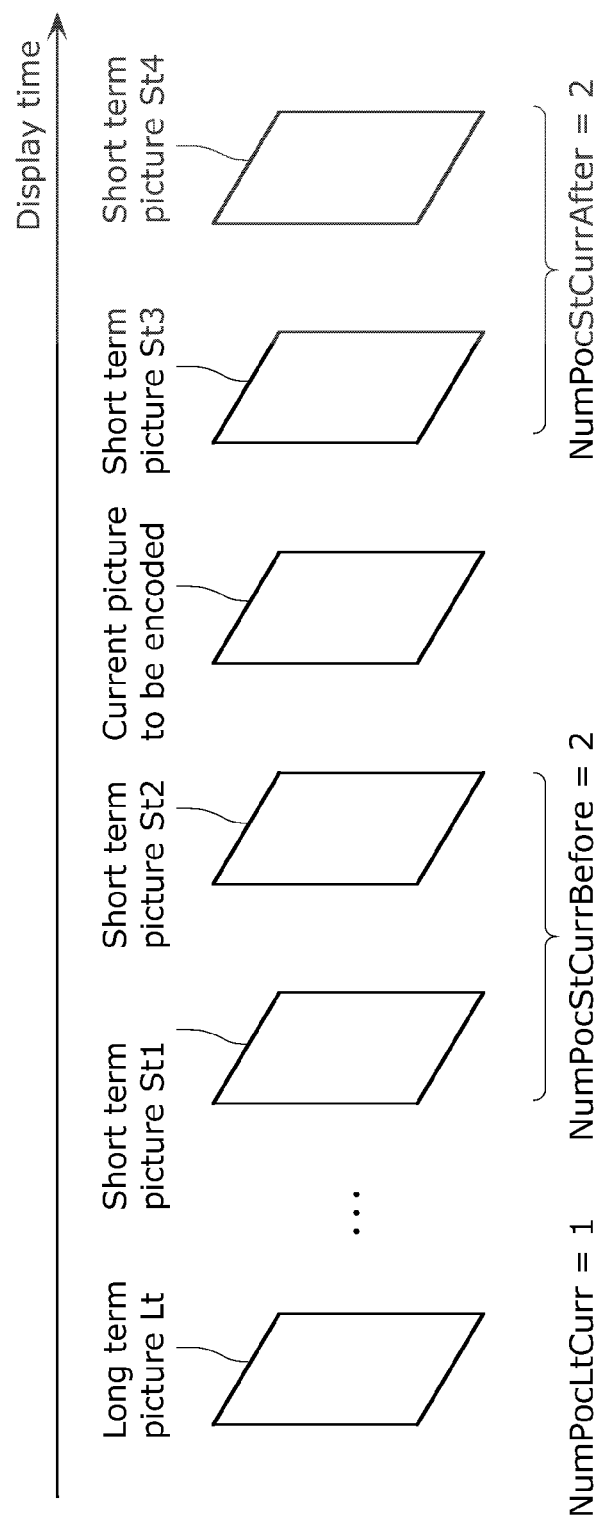
FIG. 10 is a conceptual diagram showing reference pictures in Example 1 according to Embodiment 1.

FIG. 10 is a diagram showing examples of reference pictures in the case where pictures in a different view are not used as reference pictures.

In the example shown in FIG. 10, short term pictures that precede the current picture in the picture order count and are referable in inter-prediction are short term pictures St1 and St2. The number indicated by NumPocStCurrBefore is 2. Moreover, short term pictures that follow the current picture in the picture order count and are referable in inter-prediction are short term pictures St3 and St4. The number indicated by NumPocStCurrAfter is 2.

Furthermore, a long term picture referable in inter-prediction is a long term picture Lt, and the number indicated by NumPocLtCurr is 1. In this case, NumPocTotalCurr indicating the number of pictures referable for encoding the current picture in inter-prediction is 5 (=2+2+1).

In the case as shown in FIG. 10, suppose for example that "num_ref_I0_active_minus1+1" is 5 and that ref_pic_list_modifiation_flag_I0 is 0. In this case, the reference pictures St2, St1, St3, St4, and Lt are assigned in this order into the reference picture list RefPicList0 of the first direction.

Moreover, for example, suppose that "num_ref_I1_active_minus1+1" is 5 and that ref_pic_list_modifiation_flag_I1 is 0. In this case, the reference pictures St3, St4, St2, St1, and Lt are assigned in this order into the reference picture list RefPicList1 of the second direction.

Furthermore, for example, suppose that num_ref_I0_active_minus1+1 is 5, that ref_pic_list_modifiation_flag_I0 is 1, and that list_entry_I0 indicates {4, 3, 2, 1, 0}. In this case, the reference pictures Lt, St4, St3, St1, and St2 are assigned in this order into the reference picture list RefPicList0 of the first direction.

Moreover, for example, suppose that num_ref_I1_active_minus1+1 is 5, that ref_pic_list_modifiation_flag_I1 is 1, and that list_entry_I1 indicates {1, 0, 4, 2, 3}. In this case, the reference pictures St4, St3, Lt, St2, and St1 are assigned in this order into the reference picture list RefPicList1 of the second direction.

Each of FIG. 11A to FIG. 11D shows an example of a syntax where the parameter used for calculating the reference picture list is added, as the reference picture list information, to the SPS, the PPS, the slice header, or the like.

In FIG. 11A, "lists_modification_present_flag" is a flag indicating the presence or absence of a flag indicating whether or not the reference picture list is to be modified. Moreover, "short_term_ref_pic_set (i)" is a syntax for specifying short term pictures, and "long_term_ref_pics_present_flag" is a flag indicating whether or not a long term picture is present.

In FIG. 11B, "short_term_ref_pic_set (num_short_term_ref_pic_sets)" is a syntax for specifying short term pictures, and "num_long_term_pics" indicates the number of long term pictures. Moreover, "num_ref_idx_I0_active_minus1" indicates the number of reference pictures referable in the first direction, and "num_ref_idx_I1_active_minus1" indicates the number of reference pictures referable in the second direction.

In FIG. 11C, each element is a parameter for specifying a short term picture.

In FIG. 11D, "ref_pic_list_modification_flag_I0" is a flag indicating whether or not the reference picture list of the first prediction direction is to be modified. Moreover, "ref_pic_list_modification_flag_l1" is a flag indicating whether or not the reference picture list of the second prediction direction is to be modified.

Furthermore, "list_entry_l0 [i]" is a parameter for changing the reference pictures to be assigned to the reference picture list of the first prediction direction, and "list_entry_l1 [i]" is a parameter for changing the reference pictures to be assigned to the reference picture list of the second prediction direction. Here, each of list_entry_l0 [i] and list_entry_l1 [i] is limited to a value from 0 to NumPocTotalCurr−1 inclusive.

Suppose that 0 and 1 are represented by "X". In this case, "list_entry_lX [i]" identifies the indexes of the reference pictures in the reference picture list LX. The length of list_entry_lX [i] is indicated by Ceil (Log 2 (NumPocTotalCurr)) bits. Moreover, list_entry_lX [i] is limited to a value from 0 to NumPocTotalCurr−1 inclusive. When list_entry_lX [i] is not present, list_entry_lX [i] is processed as 0.

Furthermore, as the reference picture lists, "RefPicSetStCurrBefore", "RefPicSetStCurrAfter", "RefPicSetStFoll", "RefPicSetLtCurr", and "RefPicSetLtFoll" are present. Here, NumPocTotalCurr is equal to NumPocStCurrBefore+NumPocStCurrAfter+NumPocLtCurr. When a P slice or a B slice is encoded or decoded, NumPocTotalCurr is not 0.

Each of FIG. 12A and FIG. 12B shows an example of calculating the reference picture list RefPicList0. The reference picture list RefPicList0 is calculated in encoding or decoding the header of a P slice or a B slice. Here, "NumRpsCurrTempList0" is the larger one of num_ref_idx_l0_active_minus1+1 and NumPocTotalCurr. To be more specific, FIG. 12A shows an example of calculating RefPicListTemp0 whereas FIG. 12B shows an example of calculating RefPicList0.

Each of FIG. 12C and FIG. 12D shows an example of calculating the reference picture list RefPicList1. The reference picture list RefPicList1 is calculated in encoding or decoding the header of a B slice. Here, "NumRpsCurrTempList1" is the larger one of num_ref_idx_l1_active_minus1+1 and NumPocTotalCurr. To be more specific, FIG. 12C shows an example of calculating RefPicListTemp1 whereas FIG. 12D shows an example of calculating RefPicList1.

In the present embodiment, when a different view is not referenced such as the case where a base view is encoded, the sum total of NumPocStCurrBefore, NumPocStCurrAfter, and NumPocLtCurr is set to NumPocTotalCurr indicating the number of reference pictures referable in inter-prediction. Then, the parameters, such as list_entry_l0 and list_entry_l1, having settable values that vary based on the value of NumPocTotalCurr are used.

Therefore, the reference pictures assigned to the reference picture list can be changed with flexibility and this allows the encoding efficiency to increase.

Next, a method of calculating a reference picture list in the case where a different view is referenced is described. The following calculation method is used when, for example, the image encoding apparatus 100 encodes multiview video that includes a base view and a non-base view.

Figure 13:
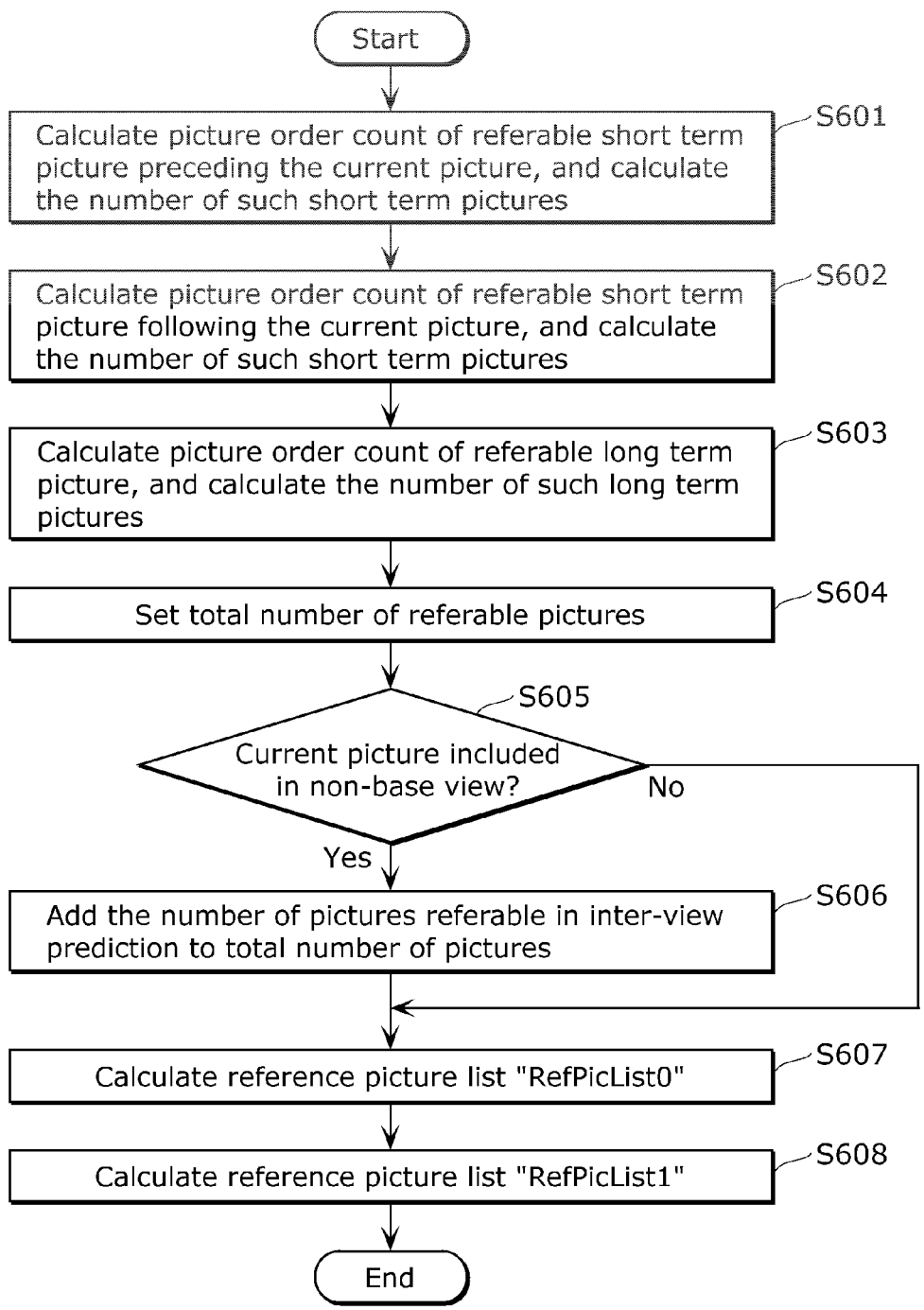
FIG. 13 is a flowchart showing processing of calculating a reference picture list in Example 2 according to Embodiment 1.

FIG. 13 is a detailed processing flow of S101 shown in FIG. 3 and shows a method of calculating the reference picture list in the case where a picture in a different view has a chance of being referenced for encoding the current picture. The following explains the method shown in FIG. 13.

The reference picture list calculation unit 115 calculates: a picture order count (POC) of a short term picture that precedes the current picture in the picture order count and is referable in inter-prediction; and the number of such short term pictures (NumPocStCurrBefore) (S601).

Next, the reference picture list calculation unit 115 calculates: a POC of a short term picture that follows the current picture in the picture order count and is referable in inter-prediction; and the number of such short term pictures (NumPocStCurrAfter) (S602).

After this, the reference picture list calculation unit 115 calculates: a POC of a long term picture that is referable in inter-prediction; and the number of such long term pictures (NumPocLtCurr) (S603).

Then, the reference picture list calculation unit 115 calculates a total number of reference pictures that are referable in inter-prediction by adding NumPocStCurrBefore, NumPocStCurrAfter, and NumPocLtCurr together (S604).

Next, the reference picture list calculation unit 115 determines whether or not the current picture is included in the non-base view (S605). Note that this determination may be made based on, for example, a view order index ("VOIdx") assigned for each view in encoding (decoding) order, a specific "nal_type", or "view_id" assigned for each view. Any method may be used for making this determination.

In the example in the present embodiment, VOIdx is used. When VOIdx is 0, the reference picture list calculation unit 115 determines that the current picture is included in the base view. On the other hand, when VOIdx is not 0, the reference picture list calculation unit 115 determines that the current picture is included in the non-base view.

When the result of the determination is true (Yes in S605), that is, when the current picture is included in the non-base view, the reference picture list calculation unit 115 adds "num_inter_view_reference [VOIdx]" to NumPocTotalCurr (S606).

Here, num_inter_view_reference [VOIdx] indicates the number of reference pictures referable for encoding the current picture in inter-view prediction. Here, by inter-view prediction, a prediction image is generated by reference to a picture in a view different from the view to which the current picture belongs.

Next, the reference picture list calculation unit 115 calculates the reference picture list RefPicList0 of the first prediction direction and the reference picture list RefPicList1 of the second prediction direction, according to a method described later (S607 and S608).

Figure 14:
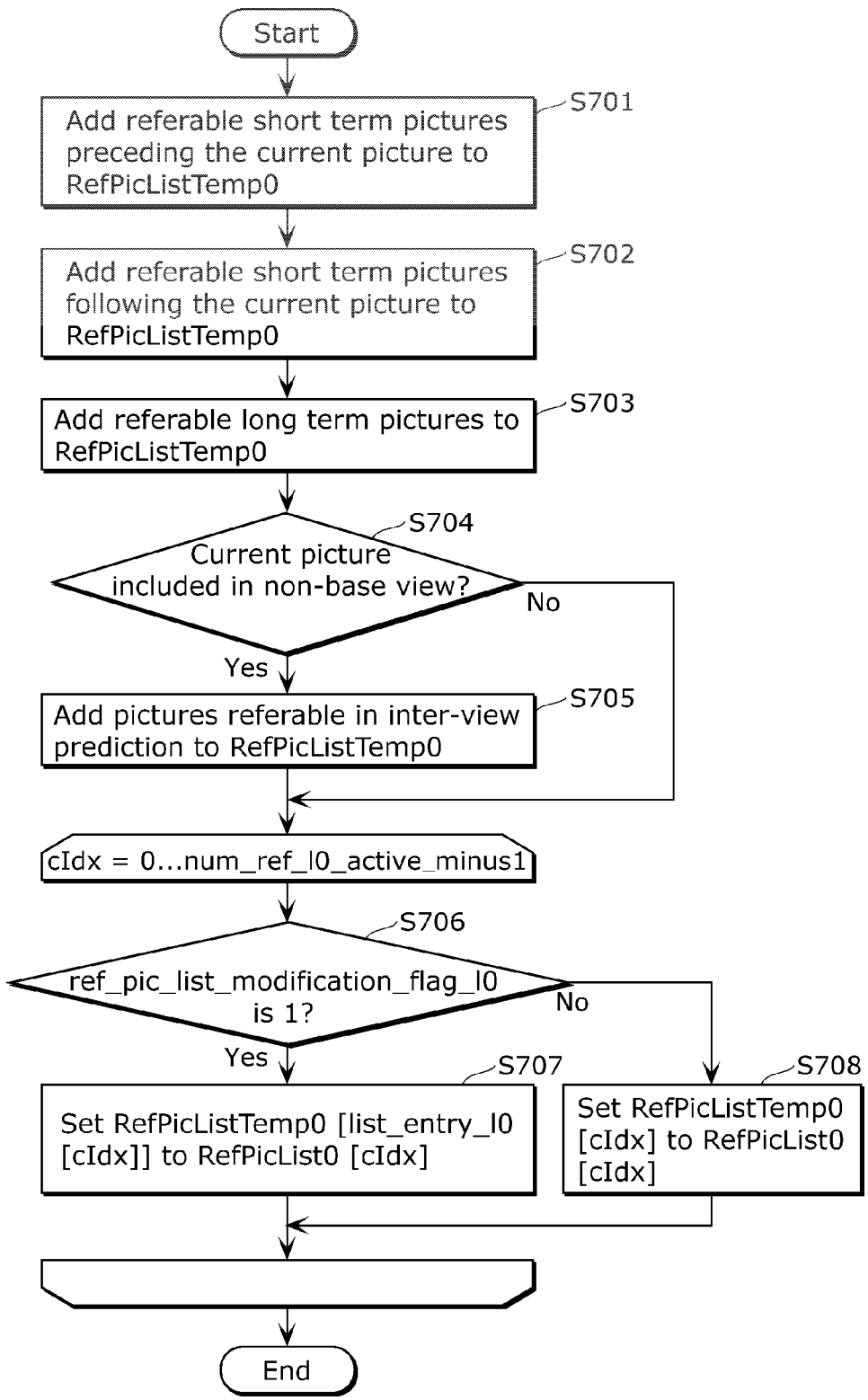
FIG. 14 is a flowchart showing processing of calculating a reference picture list of a first prediction direction in Example 2 according to Embodiment 1.

FIG. 14 is a detailed processing flow of S607 shown in FIG. 13 and shows a method of calculating the reference picture list RefPicList0 of the first prediction direction. The following explains the method shown in FIG. 14.

Firstly, the reference picture list calculation unit 115 adds, to a reference picture list "RefPicListTemp0", the reference pictures corresponding to the POCs calculated in S601 of FIG. 13 as many as the calculated NumPocStCurrBefore (S701). Next, the reference picture list calculation unit 115 adds, to the reference picture list RefPicListTemp0, the reference pictures corresponding to the POCs calculated in S602 of FIG. 13 as many as the calculated NumPocStCurrAfter (S702).

Next, the reference picture list calculation unit 115 adds, to the reference picture list RefPicListTemp0, the reference pictures corresponding to the POCs calculated in S603 of FIG. 13 as many as the calculated NumPocLtCurr (S703).

After this, the reference picture list calculation unit 115 determines whether or not the current picture is included in the non-base view (S704). Note that this determination may be made based on, for example, a view order index (VOIdx) assigned for each view in encoding (decoding) order, a specific "nal_type", or a "view_id" assigned for each view. Any method may be used for making this determination.

In the example in the present embodiment, VOIdx is used. When VOIdx is 0, the reference picture list calculation unit 115 determines that the current picture is included in the base view. On the other hand, when VOIdx is not 0, the reference picture list calculation unit 115 determines that the current picture is included in the non-base view.

When the result of the determination is true (Yes in S704), that is, when the current picture is included in the non-base view, the reference picture list calculation unit 115 adds the reference picture to the reference picture list RefPicListTemp0 (S705). To be more specific, in this case, the reference picture list calculation unit 115 adds, to the reference picture list RefPicListTemp0, the reference pictures referable for encoding the current picture according to inter-view prediction as many as num_inter-view_reference [VOIdx].

After this, the reference picture list calculation unit 115 calculates the reference picture list RefPicList0 using the reference picture list RefPicListTemp0 obtained by performing S701 to S705. The number of reference pictures in the calculated reference picture list RefPicList0 is equal to the number of reference pictures (num_ref_l0_active_minum1+1) that are referable in the first prediction direction from the current picture (or slice).

The reference picture list calculation unit 115 calculates the reference picture list RefPicList0 according to a value of a flag. To be more specific, the reference picture list calculation unit 115 determines whether or not a flag "ref_pic_list_modification_flag_10" indicating whether or not the reference picture list of the first prediction direction is to be modified is 1 (S706).

When it is true (Yes in S706), the reference picture list calculation unit 115 calculates the reference picture list RefPicList0 according to the reference picture list RefPicListTemp0 and a value of "list_entry_l0 [cIdx]" ("cIdx" indicates a value from 0 to "num_ref_l0_active_minus1") (S707).

To be more specific, the reference picture list calculation unit 115 calculates the reference picture list RefPicList0 by assigning RefPicListTemp0 [list_entry_l0 [cIdx]] to RefPicList0 [cIdx].

Here, "list_entry_l0 [cIdx]" refers to a parameter (modification list) used for modifying the reference picture list of the first prediction direction. This parameter is used for assigning the cIdx-th reference picture index to the list_entry_l0 [cIdx]-th reference picture index, and is added to the slice header or the like.

It should be noted that a range of the value of list_entry_l0 [cIdx] is based on the value of NumPocTotalCurr and is limited from 0 to "NumPocTotalCurr−1" inclusive.

When it is false (No in S706), the reference picture list calculation unit 115 calculates the reference picture list RefPicList0 using the reference picture list RefPicListTemp0 (S708). To be more specific, the reference picture list calculation unit 115 calculates the reference picture list RefPicList0 by assigning RefPicListTemp0 [cIdx] to RefPicList0 [cIdx].

Figure 15:
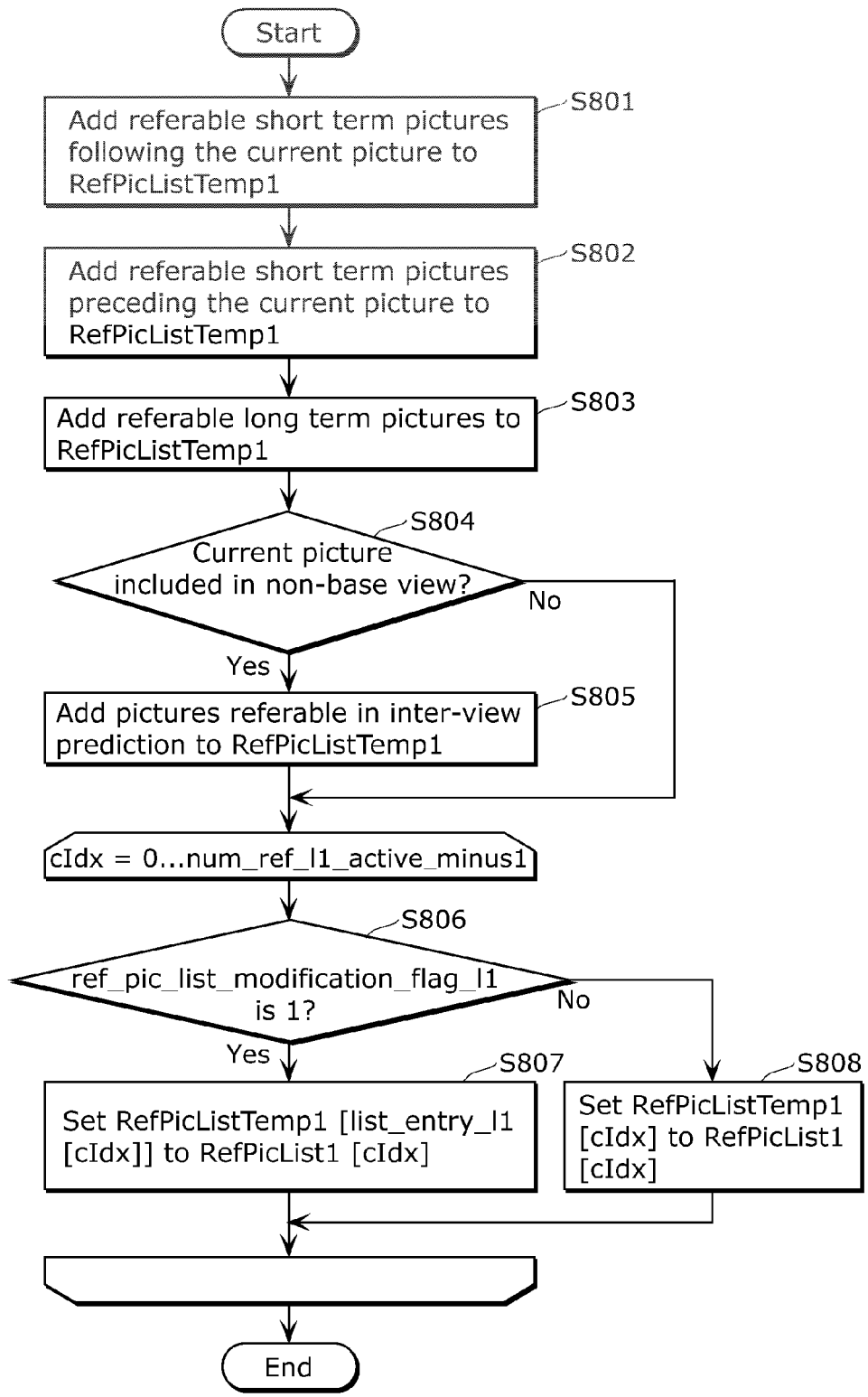
FIG. 15 is a flowchart showing processing of calculating a reference picture list of a second prediction direction in Example 2 according to Embodiment 1.

FIG. 15 is a detailed processing flow of S608 shown in FIG. 13 and shows a method of calculating the reference picture list RefPicList1 of the second prediction direction. The following explains the method shown in FIG. 15.

Firstly, the reference picture list calculation unit 115 adds, to a reference picture list "RefPicListTemp1", the reference pictures corresponding to the POCs calculated in S602 of FIG. 13 as many as the calculated NumPocStCurrAfter (S801). Next, the reference picture list calculation unit 115 adds, to the reference picture list RefPicListTemp1, the reference pictures corresponding to the POCs calculated in S601 of FIG. 13 as many as the calculated NumPocStCurrBefore (S802).

Next, the reference picture list calculation unit 115 adds, to the reference picture list RefPicListTemp1, the reference pictures corresponding to the POCs calculated in S603 of FIG. 13 as many as the calculated NumPocLtCurr (S803).

Next, the reference picture list calculation unit 115 determines whether or not the current picture is included in the non-base view (S804). Note that this determination may be made based on, for example, a view order index ("VOIdx") assigned for each view in encoding (decoding) order, a specific "nal_type", or "view_id" assigned for each view. Any method may be used for making this determination.

In the example in the present embodiment, VOIdx is used. When VOIdx is 0, the reference picture list calculation unit 115 determines that the current picture is included in the base view. On the other hand, when VOIdx is not 0, the reference picture list calculation unit 115 determines that the current picture is included in the non-base view.

When the result of the determination is true (Yes in S804), that is, when the current picture is included in the non-base view, the reference picture list calculation unit 115 adds the reference picture to the reference picture list RefPicListTemp1 (S805). To be more specific, in this case, the reference picture list calculation unit 115 adds, to the reference picture list RefPicListTemp1, the reference pictures referable for encoding the current picture according to inter-view prediction as many as num_inter-view_reference [VOIdx].

After this, the reference picture list calculation unit 115 calculates the reference picture list RefPicList1 using the reference picture list RefPicListTemp1 obtained by performing S801 to S805. The number of reference pictures in the calculated reference picture list RefPicList1 is equal to the number of reference pictures (num_ref_l1_active_minum1+1) that are referable in the second prediction direction from the current picture (or slice).

The reference picture list calculation unit 115 calculates the reference picture list RefPicList1 according to a value of a flag. To be more specific, the reference picture list calculation unit 115 determines whether or not a flag "ref_pic_list_modification_flag_11" indicating whether or not the reference picture list of the second prediction direction is to be modified is 1 (S806).

When it is true (Yes in S806), the reference picture list calculation unit 115 calculates the reference picture list RefPicList1 according to the reference picture list RefPicListTemp1 and a value of "list_entry_l1 [cIdx]" ("cIdx" indicates a value from 0 to "num_ref_l1_active_minus1") (S807).

To be more specific, the reference picture list calculation unit 115 calculates the reference picture list RefPicList1 by assigning RefPicListTemp1 [list_entry_l1 [cIdx]] to RefPicList1 [cIdx].

Here, "list_entry_l1 [cIdx]" refers to a parameter (modification list) used for modifying the reference picture list of the second prediction direction. This parameter is used for assigning the cIdx-th reference picture index to the list_entry_l1 [cIdx]-th reference picture index, and is added to the slice header or the like.

It should be noted that a range of the value of list_entry_l1 [cIdx] is based on the value of NumPocTotalCurr and is limited from 0 to "NumPocTotalCurr−1" inclusive.

When it is false (No in S806), the reference picture list calculation unit 115 calculates the reference picture list RefPicList1 using the reference picture list RefPicList- Temp1 (S808). To be more specific, the reference picture list calculation unit 115 calculates the reference picture list RefPicList1 by assigning RefPicListTemp1 [cIdx] to RefPicList1 [cIdx].

Figure 16:
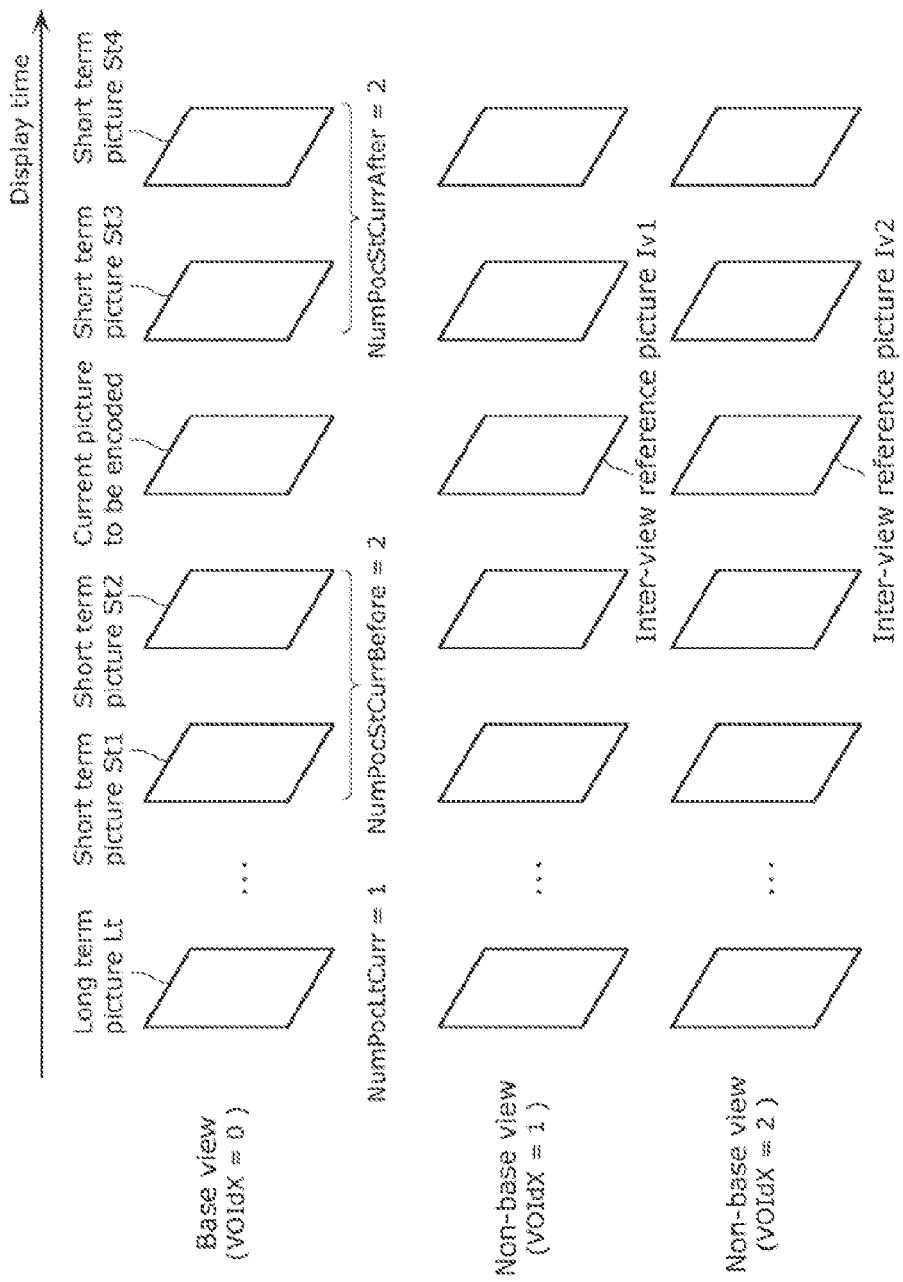
FIG. 16 is a conceptual diagram showing reference pictures in Example 2 according to Embodiment 1.

FIG. 16 is a diagram showing examples of reference pictures in the case where pictures in a different view are used as reference pictures. In the example shown in FIG. 16, the current picture belongs to the non-base view and VOIdx is 2.

Short term pictures that precede the current picture in the picture order count and are referable in inter-prediction are short term pictures St1 and St2. The number indicated by NumPocStCurrBefore is 2. Moreover, short term pictures that follow the current picture in the picture order count and are referable in inter-prediction are short term pictures St3 and St4. The number indicated by NumPocStCurrAfter is 2.

Furthermore, a long term picture referable in inter-prediction is a long term picture Lt, and the number indicated by NumPocLtCurr is 1. Moreover, reference pictures referable in inter-view prediction (inter-view_reference pictures) are inter-view_reference pictures Iv1 and Iv2, and the number indicated by num_inter-view_reference [VOIdx] is 2.

In this case, NumPocTotalCurr indicating the number of pictures referable for encoding the current picture in inter-prediction is 5 (=2+2+1). To this value, num_inter-view_reference [VOIdx] indicating the number of pictures referable in inter-view prediction is added. Accordingly, NumPocTotalCurr is set to 7.

In the case as shown in FIG. 16, suppose for example that "num_ref_I0_active_minus1+1" is 5 and that ref_pic_list_modifiation_flag_I0 is 0. In this case, the reference pictures St2, St1, St3, St4, Lt, Iv1, and Iv2 are assigned in this order into the reference picture list RefPicList0 of the first direction.

Moreover, for example, suppose that "num_ref_I1_active_minus1+1" is 5 and that ref_pic_list_modifiation_flag_I1 is 0. In this case, the reference pictures St3, St4, St2, St1, Lt, Iv1, and Iv2 are assigned in this order into the reference picture list RefPicList1 of the second direction.

Furthermore, for example, suppose that num_ref_I0_active_minus1+1 is 5, that ref_pic_list_modifiation_flag_I0 is 1, and that list_entry_I0 indicates {6, 5, 4, 3, 2, 1, 0}. In this case, the reference pictures Iv2, Iv1, Lt, St4, St3, St1, and St2 are assigned in this order into the reference picture list RefPicList0 of the first direction.

Moreover, for example, suppose that num_ref_I1_active_minus1+1 is 5, that ref_pic_list_modifiation_flag_I1 is 1, and that list_entry_I1 indicates {1, 0, 4, 2, 3, 6, 5}. In this case, the reference pictures St4, St3, Lt, St2, St1, Iv2, and Iv1 are assigned in this order into the reference picture list RefPicList1 of the second direction.

Even when the different view is referenced, the syntaxes shown in FIG. 11A to FIG. 11D may be used.

Moreover, as mentioned above, as the reference picture lists, "RefPicSetStCurrBefore", "RefPicSetStCurrAfter", "RefPicSetStFoll", "RefPicSetLtCurr", and "RefPicSetLtFoll" are present. Here, NumPocTotalCurr is equal to NumPocStCurrBefore NumPocStCurrAfter+NumPocLtCurr. When a P slice or a B slice is encoded or decoded, NumPocTotalCurr is not 0.

In addition, when the current picture is included in the non-base view (VOIdx!=0), num_inter-view_reference [VOIdx] indicating the number of reference pictures referable in inter-view prediction is added to NumPocTotalCurr. Note that, in the case of MVC (multiview video coding), num_inter-view_reference is equal to "num_anchor_refs_IX [i]" or "num_anchor_refs_iX [i]".

Moreover, even when the different view is referenced, the reference picture list RefPicList0 of the first prediction direction may be calculated based on the examples shown in FIG. 12A and FIG. 12B. In addition, when the current picture is included in the non-base view (VOIdx!=0), the reference pictures referable in inter-view prediction is added to the reference picture list RefPicListTemp0. The number of added reference pictures is equal to num_inter-view_reference.

To be more specific, when reference view indexes j from 0 to "num_inter-view_reference [VOIdx]-1" are present, the reference pictures corresponding to "inter-view_reference [VOIdx] [j]" are added to RefPicListTemp0 and RefPicList0.

Similarly, even when the different view is referenced, the reference picture list RefPicList1 of the second prediction direction may be calculated based on the examples shown in FIG. 12C and FIG. 12D. In addition, when the current picture is included in the non-base view (VOIdx!=0), the reference pictures referable in inter-view prediction is added to the reference picture list RefPicListTemp1. The number of added reference pictures is equal to num_inter-view_reference.

To be more specific, when reference view indexes j from 0 to "num_inter-view_reference [VOIdx]-1" are present, the reference pictures corresponding to "inter-view_reference [VOIdx] [j]" are added to RefPicListTemp1 and RefPicList1.

In the present embodiment, when a picture in a different view is referenced for encoding the current picture, such as when a picture included in a non-base view is encoded, the picture in the different view is added as a reference picture to the reference picture list of the current picture. Therefore, the picture in the different view is set as being referable in the reference picture list, and this allows the encoding efficiency to increase.

The sum total of NumPocStCurrBefore, NumPocStCurrAfter, and NumPocLtCurr is set to NumPocTotalCurr indicating the number of reference pictures referable in inter-prediction.

Moreover, num_inter-view_reference [VOIdx] indicating the number of reference pictures referable in inter-view prediction is added to NumPocTotalCurr. As a result, NumPocTotalCurr is calculated. Then, the parameters, such as list_entry_I0 and list_entry_I1, having settable values that vary based on the value of NumPocTotalCurr are used.

Therefore, the reference pictures assigned to the reference picture list can be changed with flexibility and this allows the encoding efficiency to increase.

The present embodiment describes the case, as an example, where the picture in the different view is referenced for encoding the current picture such as where the picture included in the non-base view is encoded. However, the scope of application is not limited to this. For example, the method described in the present embodiment may be applied to the case where a picture in a different layer is referenced for encoding the current picture.

For example, the method described in the present embodiment may be applied to scalable video coding (SVC) or the like. In this case, for example, the sum total of NumPocStCurrBefore, NumPocStCurrAfter, and NumPocLtCurr is set to NumPocTotalCurr indicating the number of reference pictures referable in inter-prediction. Moreover, the number of reference pictures that are referable and included in a different layer may be added to NumPocTotalCurr.

Furthermore, as in the case described above, the parameters, such as list_entry_I0 and list_entry_I1, having settable values that vary based on the value of NumPocTotalCurr are used. Therefore, the reference pictures assigned to the reference picture list can be changed with flexibility and this allows the encoding efficiency to increase.

Embodiment 2

Figure 17:
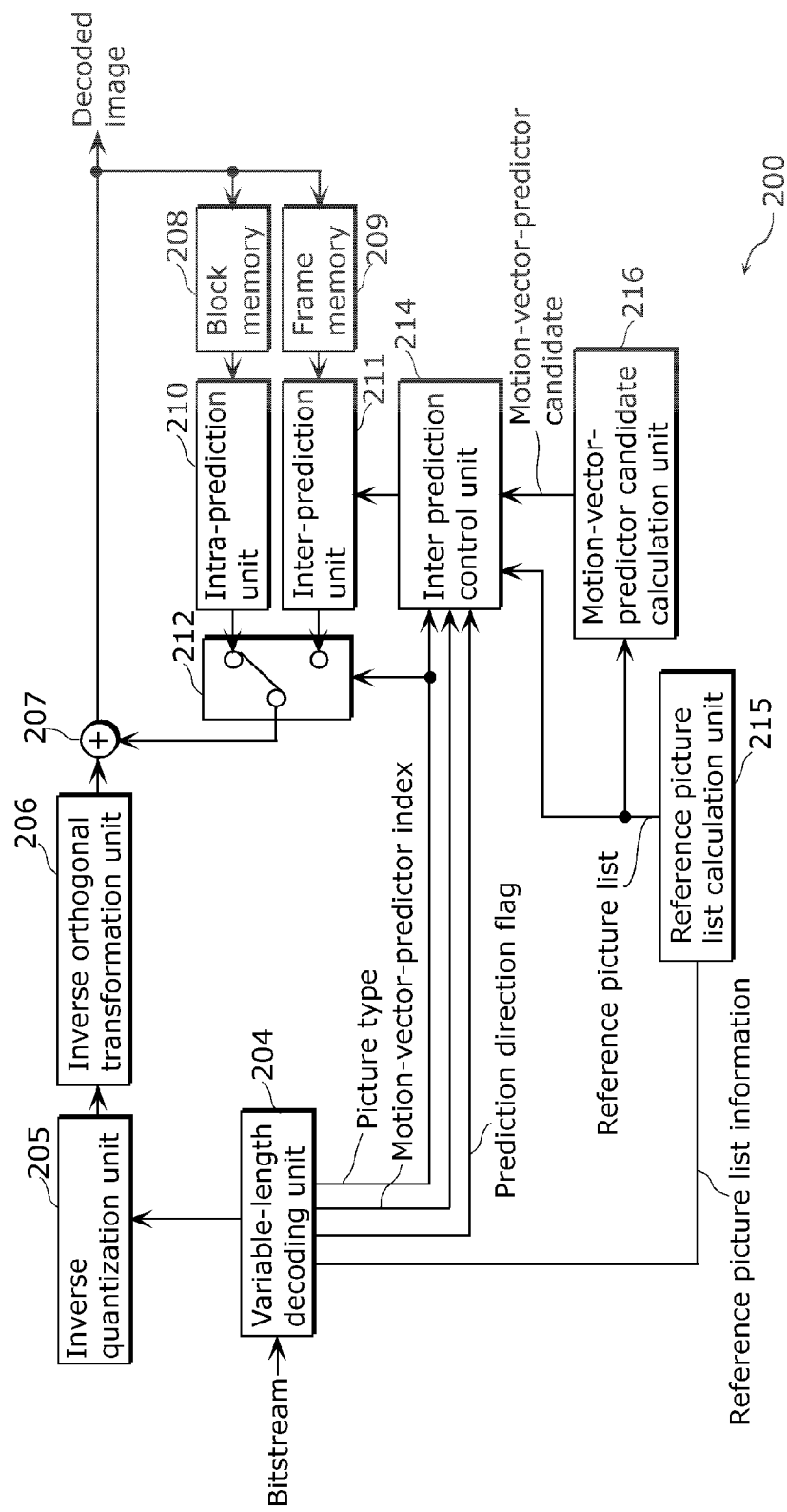
FIG. 17 is a block diagram showing a configuration of an image decoding apparatus in Embodiment 2.

FIG. 17 is a block diagram showing a configuration of an image decoding apparatus in the present embodiment. As shown in FIG. 17, an image decoding apparatus 200 includes a variable-length decoding unit 204, an inverse quantization unit 205, an inverse orthogonal transformation unit 206, an addition unit 207, a block memory 208, a frame memory 209, an intra-prediction unit 210, an inter-prediction unit 211, a switching unit 212, an inter-prediction control unit 214, a reference picture list calculation unit 215, and a motion-vector-predictor candidate calculation unit 216.

The variable-length decoding unit 204 performs variable-length decoding on an input bitstream to generate picture type information, a prediction direction flag, quantized coefficients, and reference picture list information. Moreover, the variable-length decoding unit 204 performs variable-length decoding on a motion-vector-predictor index using the number of motion-vector-predictor candidates decoded based on the header or the like.

The inverse quantization unit 205 performs inverse quantization on the quantized coefficients obtained by variable-length decoding. The inverse orthogonal transformation unit 206 transforms the orthogonally-transformed coefficients obtained by inverse quantization, from the frequency domain into the pixel domain, to generate prediction error image data. The block memory 208 stores, on a block-by-block basis, an image generated by adding the prediction error image data to the prediction image data. The frame memory 209 stores the image on a frame-by-frame basis.

The intra-prediction unit 210 generates prediction error image data of a block that is to be decoded (i.e., a current block) by performing intra-prediction using images stored in the block memory 208 on the block-by-block basis. The inter-prediction unit 211 generates prediction error image data of the current block by performing inter-prediction using images stored in the frame memory 209 on the frame-by-frame basis.

The reference picture list calculation unit 215 calculates a reference picture list used for decoding a picture that is to be decoded (i.e., a current picture) or slice, according to a method described later. Then, the reference picture list calculation unit 215 outputs the reference picture list to the inter-prediction control unit 214 and the motion-vector-predictor candidate calculation unit 216.

The motion-vector-predictor candidate calculation unit 216 derives a motion-vector-predictor candidate using information on a motion vector or the like of a neighboring block of the current block and information on a motion vector or the like of a co-located block that is stored in a colPic memory. Moreover, the motion-vector-predictor candidate calculation unit 216 assigns a value of a motion-vector-predictor index to the derived motion-vector-predictor candidate, and transmits the motion-vector-predictor candidate to the inter-prediction control unit 214.

The inter-prediction control unit 214 calculates a motion vector used for inter-prediction from the motion-vector-predictor candidate, based on the decoded motion-vector-predictor index. Then, the inter-prediction control unit 214 generates an inter-prediction image using the calculated motion vector.

Finally, the addition unit 207 adds the decoded prediction image data to the prediction error image data to generate a decoded image.

Figure 18:
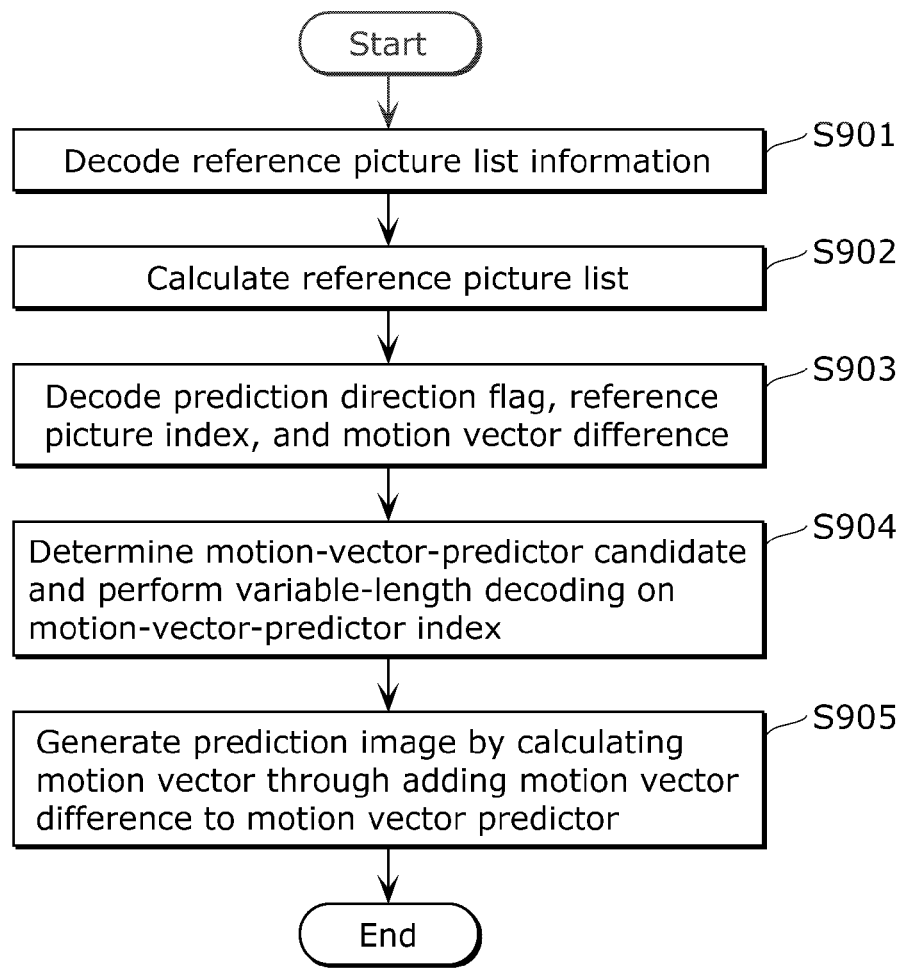
FIG. 18 is a flowchart showing an operation of the image decoding apparatus in Embodiment 2.

FIG. 18 is a general processing flow of an image decoding method in the present embodiment. Firstly, from an SPS, a PPS, a slice header, or the like, the variable-length decoding unit 204 decodes the reference picture list information used for calculating a reference picture list (S901). The reference picture list calculation unit 215 calculates the reference picture list according to the same method as in FIG. 7 or FIG. 13 (S902). The variable-length decoding unit 204 decodes the prediction direction flag, the reference picture index, and a motion vector difference (S903).

The motion-vector-predictor candidate calculation unit 216 generates motion-vector-predictor candidates based on the neighboring blocks and co-located blocks of the current block. Moreover, the variable-length decoding unit 204 performs variable-length decoding on the motion-vector-predictor index included in the bitstream using a motion-vector-predictor candidate list size obtained by variable-length decoding (S904).

The inter-prediction control unit 214 calculates the motion vector by adding the decoded motion vector difference to the motion vector predictor candidate indicated by the decoded motion-vector-predictor index. Accordingly, the inter-prediction unit 211 generates the inter-prediction image (S905).

When the current picture is to be decoded without reference to a picture in a different view in S902 of FIG. 18, the reference picture list calculation unit 215 calculates the reference picture list according to the same method as in FIG. 7. When the current picture is to be decoded with reference to a picture in a different view, the reference picture list calculation unit 215 calculates the reference picture list according to the same method as in FIG. 13.

In the present embodiment, when a different view is not referenced such as the case where a base view is decoded, the sum total of NumPocStCurrBefore, NumPocStCurrAfter, and NumPocLtCurr is set to NumPocTotalCurr indicating the number of reference pictures referable in inter-prediction. Then, the parameters, such as list_entry_I0 and list_entry_I1, having settable values that vary based on the value of NumPocTotalCurr are used.

Therefore, the reference pictures assigned to the reference picture list can be changed with flexibility. Hence, decoding corresponding to highly-efficient encoding can be implemented.

In the present embodiment, when a picture in a different view is referenced for decoding the current picture, such as when a picture included in a non-base view is decoded, the picture in the different view is added as a reference picture to the reference picture list of the current picture. Therefore, the picture in the different view is set as being referable in the reference picture list. Hence, decoding corresponding to highly-efficient encoding can be implemented.

The sum total of NumPocStCurrBefore, NumPocStCurrAfter, and NumPocLtCurr is set to NumPocTotalCurr indicating the number of reference pictures referable in inter-prediction.

Moreover, num_inter_view_reference [VOIdx] indicating the number of reference pictures referable in inter-view prediction is added to NumPocTotalCurr. Then, the parameters, such as list_entry_I0 and list_entry_I1, having settable values that vary based on the value of NumPocTotalCurr are used.

Therefore, the reference pictures assigned to the reference picture list can be changed with flexibility. Hence, decoding corresponding to highly-efficient encoding can be implemented.

The present embodiment describes the case, as an example, where the picture in the different view is referenced for decoding the current picture such as where the picture included in the non-base view is decoded. However, the scope of application is not limited to this. For example, the method described in the present embodiment may be applied to the case where a picture in a different layer is referenced for decoding the current picture.

For example, the method described in the present embodiment may be applied to scalable video coding (SVC) or the like. In this case, for example, the sum total of NumPocStCurrBefore, NumPocStCurrAfter, and NumPocLtCurr is set to NumPocTotalCurr indicating the number of reference pictures referable in inter-prediction. Moreover, the number of reference pictures that are referable and included in a different layer may be added to NumPocTotalCurr.

Furthermore, as in the case described above, the parameters, such as list_entry_I0 and list_entry_I1, having settable values that vary based on the value of NumPocTotalCurr are used. Therefore, the reference pictures assigned to the reference picture list can be changed with flexibility. Hence, decoding corresponding to highly-efficient encoding can be implemented.

Embodiment 3

The present embodiment describes, for confirmation, the characteristic configurations and the characteristic steps described in the above embodiments.

Figure 19:
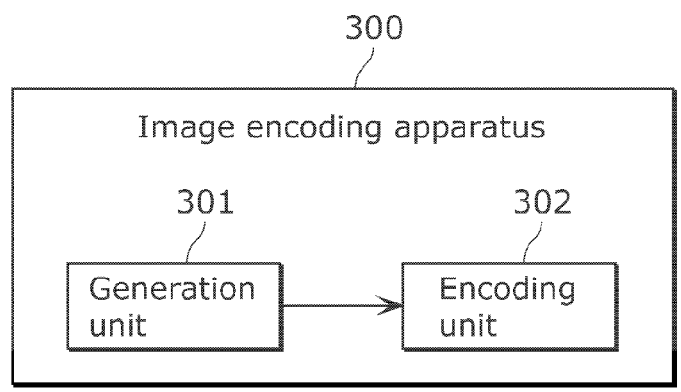
FIG. 19 is a block diagram showing a configuration of an image encoding apparatus in Embodiment 3.

FIG. 19 is a block diagram showing a configuration of an image encoding apparatus in the present embodiment. As shown in FIG. 19, an image encoding apparatus 300 includes a generation unit 301 and an encoding unit 302. The generation unit 301 corresponds to, for example, the reference picture list calculation unit 115 described in Embodiment 1. The encoding unit 302 corresponds to, for example, the inter-prediction control unit 114, the inter-prediction unit 111, and the variable-length encoding unit 104 described in Embodiment 1.

Figure 20:
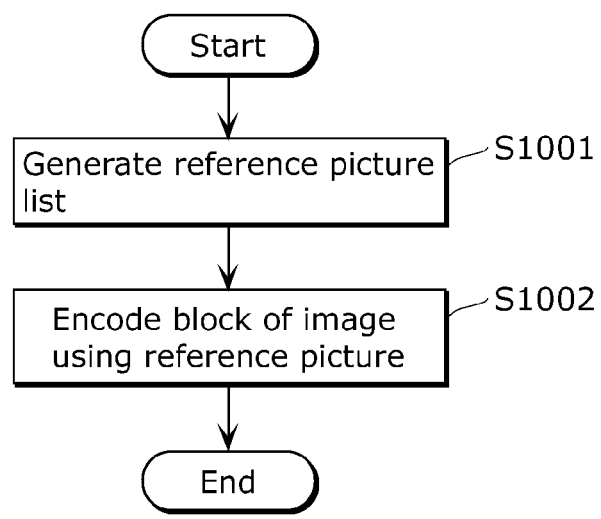
FIG. 20 is a flowchart showing an operation of the image encoding apparatus in Embodiment 3.

FIG. 20 is a flowchart showing an operation performed by the image encoding apparatus 300 shown in FIG. 19. The image encoding apparatus 300 encodes a current picture on a block-by-block basis according to the following operation.

Firstly, the generation unit 301 assigns a reference picture index to a reference picture that is referable for encoding the current picture. Then, the generation unit 301 generates a reference picture list including the reference picture assigned the reference picture index (S1001). In doing so, when a reference picture belonging to a reference view different from a current view to which the current picture belongs has a chance of being referenced for encoding the current picture, the generation unit 301 adds the reference picture belonging to the reference view to the reference picture list.

Next, the encoding unit 302 specifies, from the reference picture list, the reference picture referenced for encoding a current block included in the current picture. Then, the encoding unit 302 encodes the current block with reference to the specified reference picture (S1002).

With this, when inter-view prediction can be performed, the reference picture used for inter-view prediction is added to the reference picture list. Therefore, a more appropriate reference picture can be selected from the reference picture list. Hence, the encoding efficiency is increased.

It should be noted that the generation unit 301 may generate the reference picture list using a predetermined parameter (such as a modification list). Moreover, the encoding unit 302 may encode the parameter used for generating the reference picture list.

Furthermore, when the reference picture belonging to the reference view has a chance of being referenced for encoding the current picture, the generation unit 301 may calculate the number of reference pictures referable for encoding the current picture. For example, in this case, the generation unit 301 calculates the number of reference pictures referable for encoding the current picture, by adding the number of referable reference pictures belonging to the reference view to the number of referable reference pictures belonging to the current view.

Moreover, in this case, the generation unit 301 may determine, based on the calculated number, a range of a value in the modification list used for modifying the reference picture index assigned to the reference picture included in the reference picture list.

Furthermore, for example, the generation unit 301 may determine whether or not the reference picture belonging to the reference view has a chance of being referenced for encoding the current picture, based on whether or not the current view is a non-base view. Moreover, for example, the generation unit 301 may determine whether or not the current view is a non-base view, based on the view order index assigned to the current view in encoding order.

Figure 21:
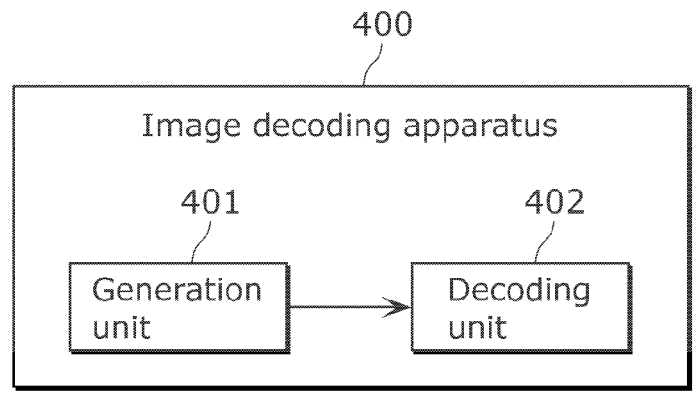
FIG. 21 is a block diagram showing a configuration of an image decoding apparatus in Embodiment 3.

FIG. 21 is a block diagram showing a configuration of an image decoding apparatus in the present embodiment. As shown in FIG. 21, an image decoding apparatus 400 includes a generation unit 401 and a decoding unit 402. The generation unit 401 corresponds to, for example, the reference picture list calculation unit 215 described in Embodiment 2. The decoding unit 402 corresponds to, for example, the inter-prediction control unit 214, the inter-prediction unit 211, and the variable-length decoding unit 204 described in Embodiment 2.

Figure 22:
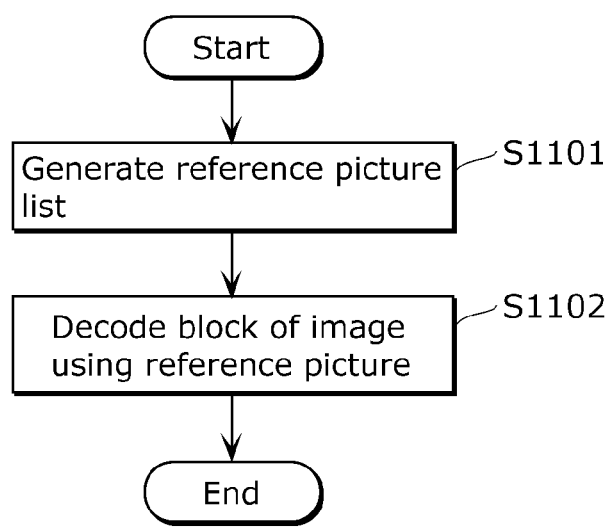
FIG. 22 is a flowchart showing an operation of the image decoding apparatus in Embodiment 3.

FIG. 22 is a flowchart showing an operation performed by the image decoding apparatus 400 shown in FIG. 21. The image decoding apparatus 400 decodes a current picture on a block-by-block basis according to the following operation.

Firstly, the generation unit 401 assigns a reference picture index to a reference picture that is referable for decoding the current picture. Then, the generation unit 401 generates a reference picture list including the reference picture assigned the reference picture index (S1101). In doing so, when a reference picture belonging to a reference view different from a current view to which the current picture belongs has a chance of being referenced for decoding the current picture, the generation unit 401 adds the reference picture belonging to the reference view to the reference picture list.

Next, the decoding unit 402 specifies, from the reference picture list, the reference picture referenced for decoding a current block included in the current picture. Then, the decoding unit 402 decodes the current block with reference to the specified reference picture (S1102).

With this, when inter-view prediction can be performed, the reference picture used for inter-view prediction is added to the reference picture list. Therefore, a more appropriate reference picture can be selected from the reference picture list. Hence, decoding corresponding to highly-efficient encoding can be implemented.

It should be noted that the decoding unit 402 may decode a predetermined parameter (such as a modification list) used for generating the reference picture list. Moreover, the generation unit 401 may generate the reference picture list using the decoded parameter.

Furthermore, when the reference picture belonging to the reference view has a chance of being referenced for decoding the current picture, the generation unit 401 may calculate the number of reference pictures referable for decoding the current picture. For example, in this case, the generation unit 401 calculates the number of reference pictures referable for decoding the current picture, by adding the number of referable reference pictures belonging to the reference view to the number of referable reference pictures belonging to the current view.

Moreover, in this case, the generation unit 401 may determine, based on the calculated number, a range of a value in the modification list used for modifying the reference picture index assigned to the reference picture included in the reference picture list.

Furthermore, for example, the generation unit 401 may determine whether or not the reference picture belonging to the reference view has a chance of being referenced for decoding the current picture, based on whether or not the current view is a non-base view. Moreover, for example, the generation unit 401 may determine whether or not the current view is a non-base view, based on the view order index assigned to the current view in decoding order.

As described above, the image encoding apparatus 300 and the image decoding apparatus 400 in the present embodiment add the reference picture in the different view to the reference picture list. Therefore, a more appropriate reference picture can be selected. Hence, the encoding efficiency is increased.

Each of the structural elements in each of the above embodiments may be configured in the form of an exclusive hardware product, or may be realized by executing a software program suitable for the structural element. Each of the structural elements may be realized by means of a program executing unit, such as a CPU and a processor, reading and executing the software program recorded on the recording medium such as a hard disk or a semiconductor memory. Here, the software program for realizing the image encoding apparatus according to each of the embodiments is a program described below.

The program is an image encoding method of encoding a current picture on a block-by-block basis, the program causing a computer to execute: generating a reference picture list by (i) assigning a reference picture index to a reference picture referable for encoding the current picture and (ii) including the reference picture assigned the reference picture index into the reference picture list; and encoding a current block included in the current picture with reference to a reference picture that is specified, from the reference picture list, for encoding the current block, wherein, when a reference picture belonging to a reference view different from a current view to which the current picture belongs has a chance of being referenced for encoding the current picture, the reference picture belonging to the reference view is added to the reference picture list in the generating.

Moreover, the program is an image decoding method of decoding a current picture on a block-by-block basis, the program causing a computer to execute: generating a reference picture list by (i) assigning a reference picture index to a reference picture referable for decoding the current picture and (ii) including the reference picture assigned the reference picture index into the reference picture list; and decoding a current block included in the current picture with reference to a reference picture that is specified, from the reference picture list, for decoding the current block, wherein, when a reference picture belonging to a reference view different from a current view to which the current picture belongs has a chance of being referenced for decoding the current picture, the reference picture belonging to the reference view is added to the reference picture list in the generating.

Furthermore, the structural elements may be circuits. These circuits may be configured as a single circuit as a whole, or may be configured as individually different circuits. Moreover, each of the structural elements may be implemented as a general-purpose processor or an exclusive processor.

Although the image encoding apparatus and so forth according to an aspect or aspects have been described by means of the above embodiments, the present invention is not limited to these embodiments. Other embodiments implemented through various changes and modifications conceived by a person of ordinary skill in the art or through a combination of the structural elements in different embodiments described above may be included in the scope according to an aspect or aspects of the present invention, unless such changes, modifications, and combination depart from the scope of the present invention.

For example, an image coding apparatus may include an image encoding apparatus and an image decoding apparatus. Moreover, processing performed by a specific processing unit may be performed by a different processing unit. Furthermore, the order in which processes are performed may be changed, and a plurality of processes may be performed in parallel.

Embodiment 4

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 23:
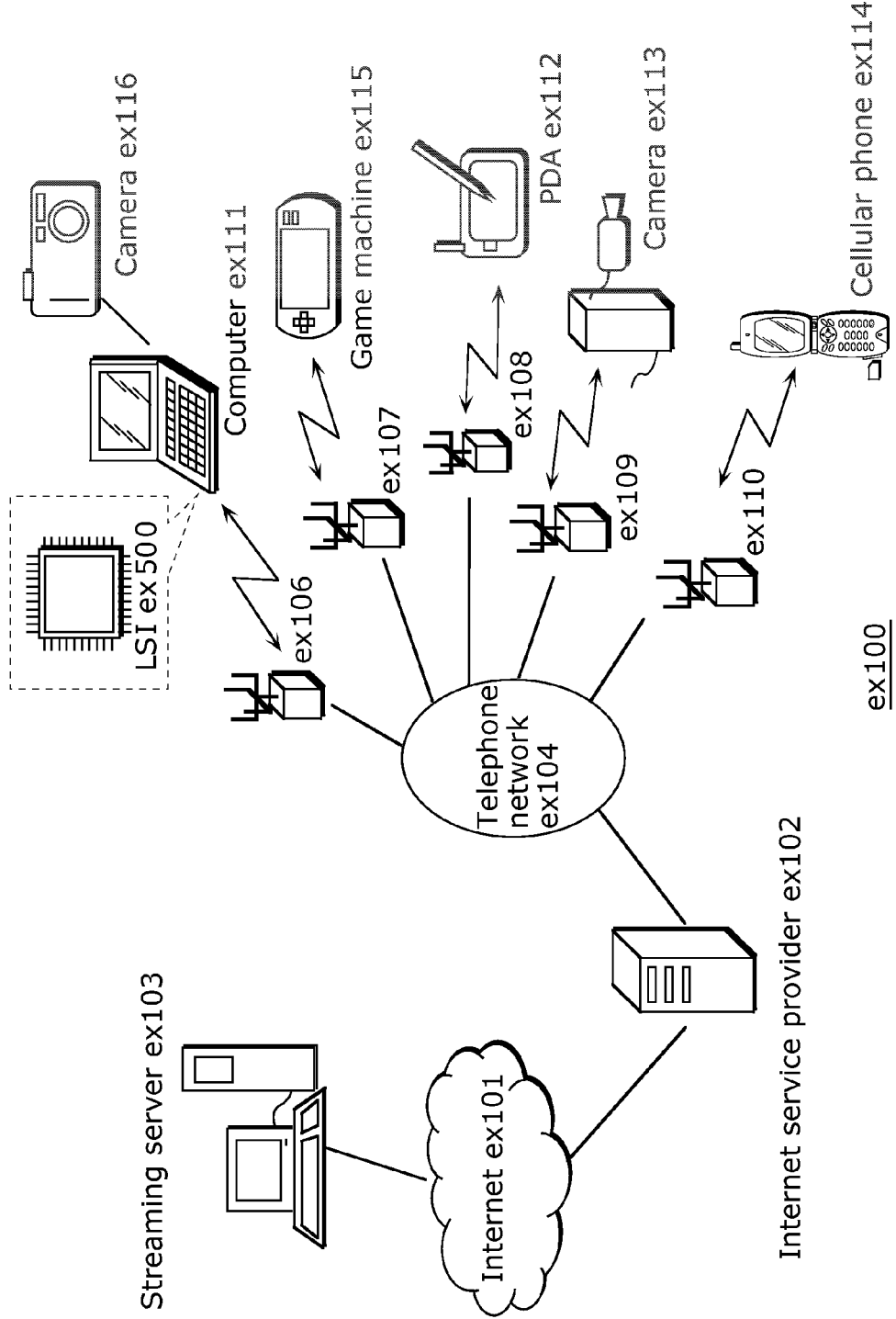
FIG. 23 shows an overall configuration of a content providing system for implementing content distribution services.

FIG. 23 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 23, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present invention), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present invention).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 24:
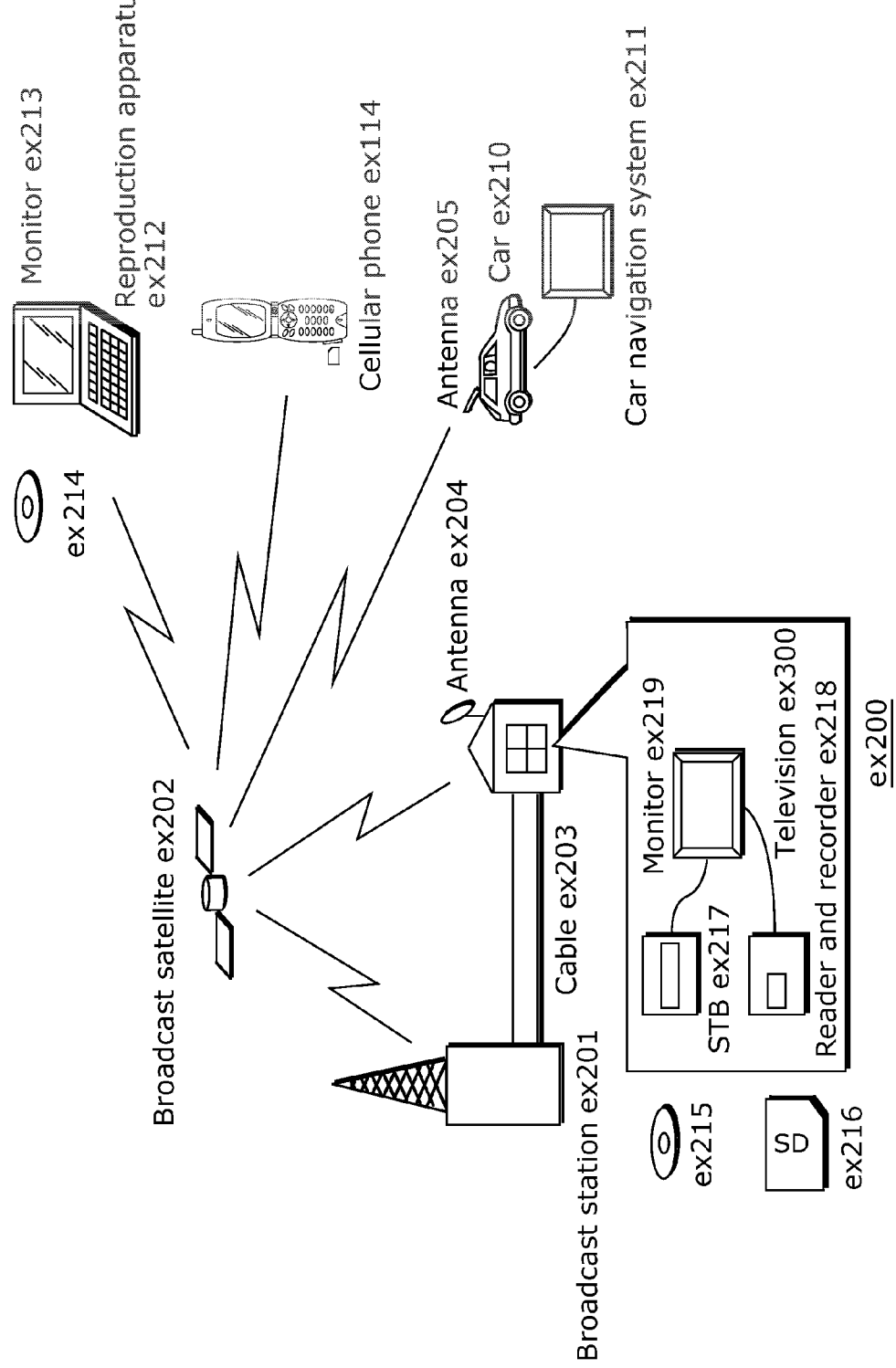
FIG. 24 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 24. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 25:
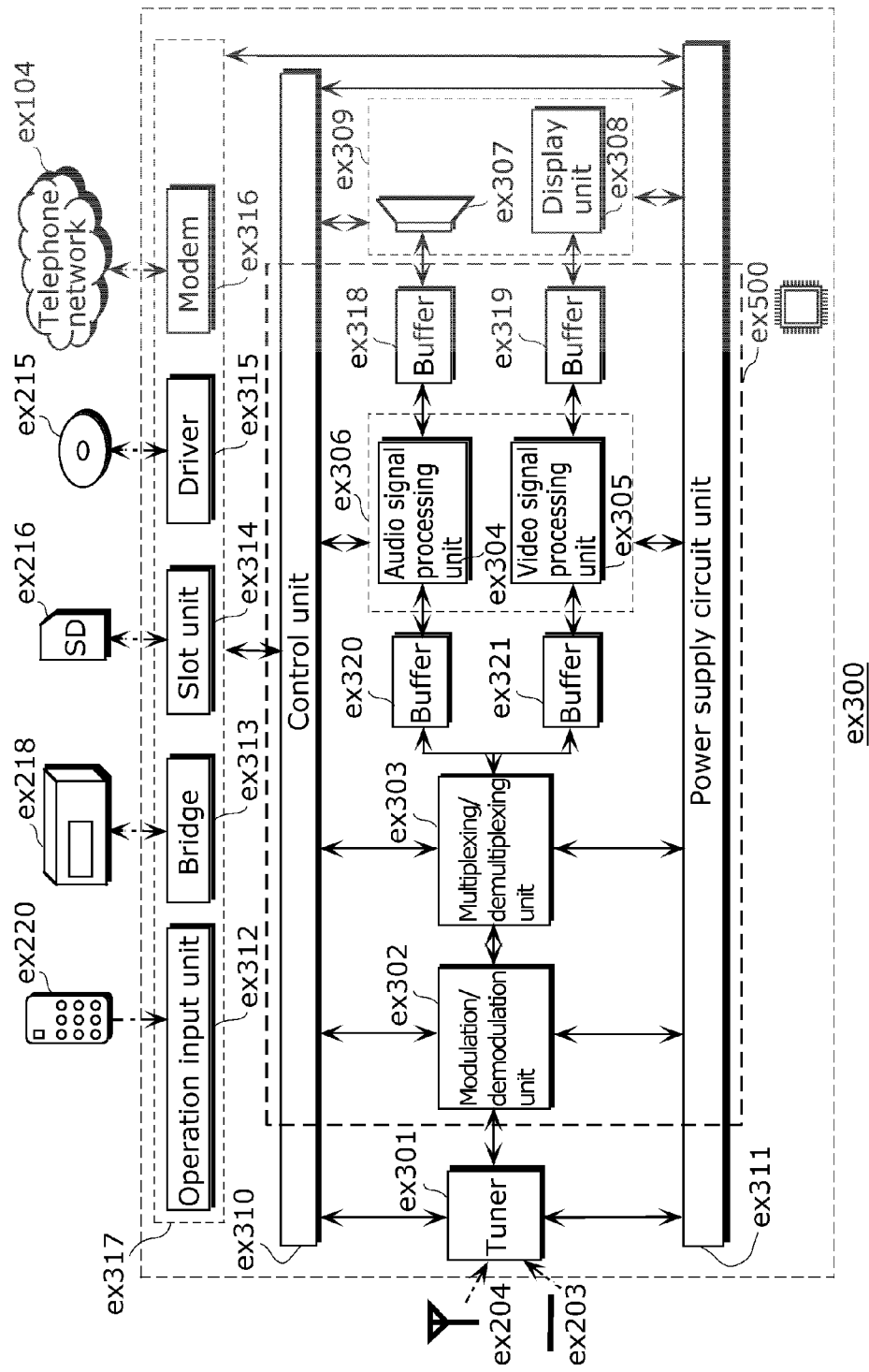
FIG. 25 shows a block diagram illustrating an example of a configuration of a television.

FIG. 25 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 26:
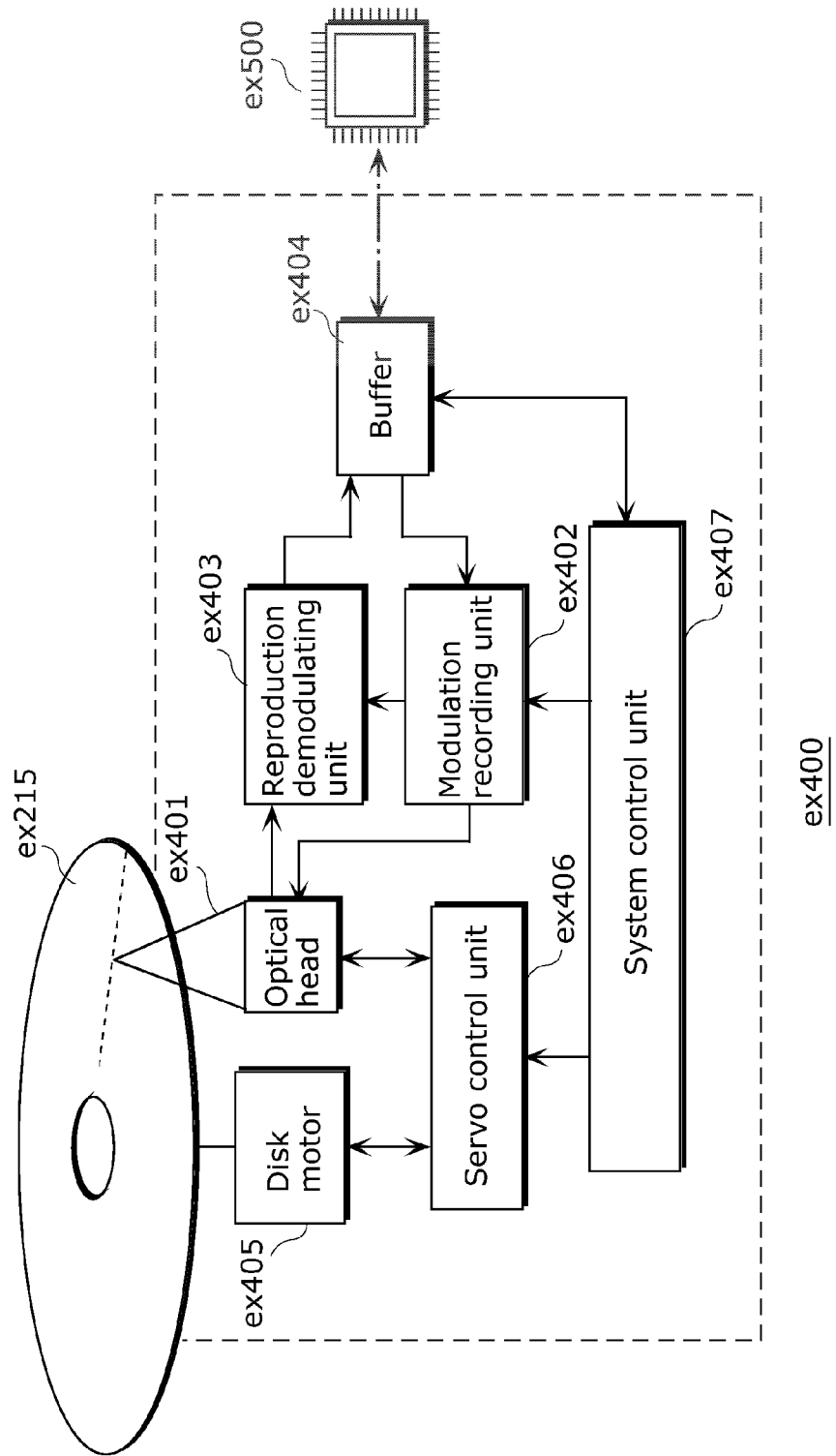
FIG. 26 shows a block diagram illustrating an example of a configuration of an information reproducing/recording unit that reads and writes information from and on a recording medium that is an optical disk.

As an example, FIG. 26 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 27:
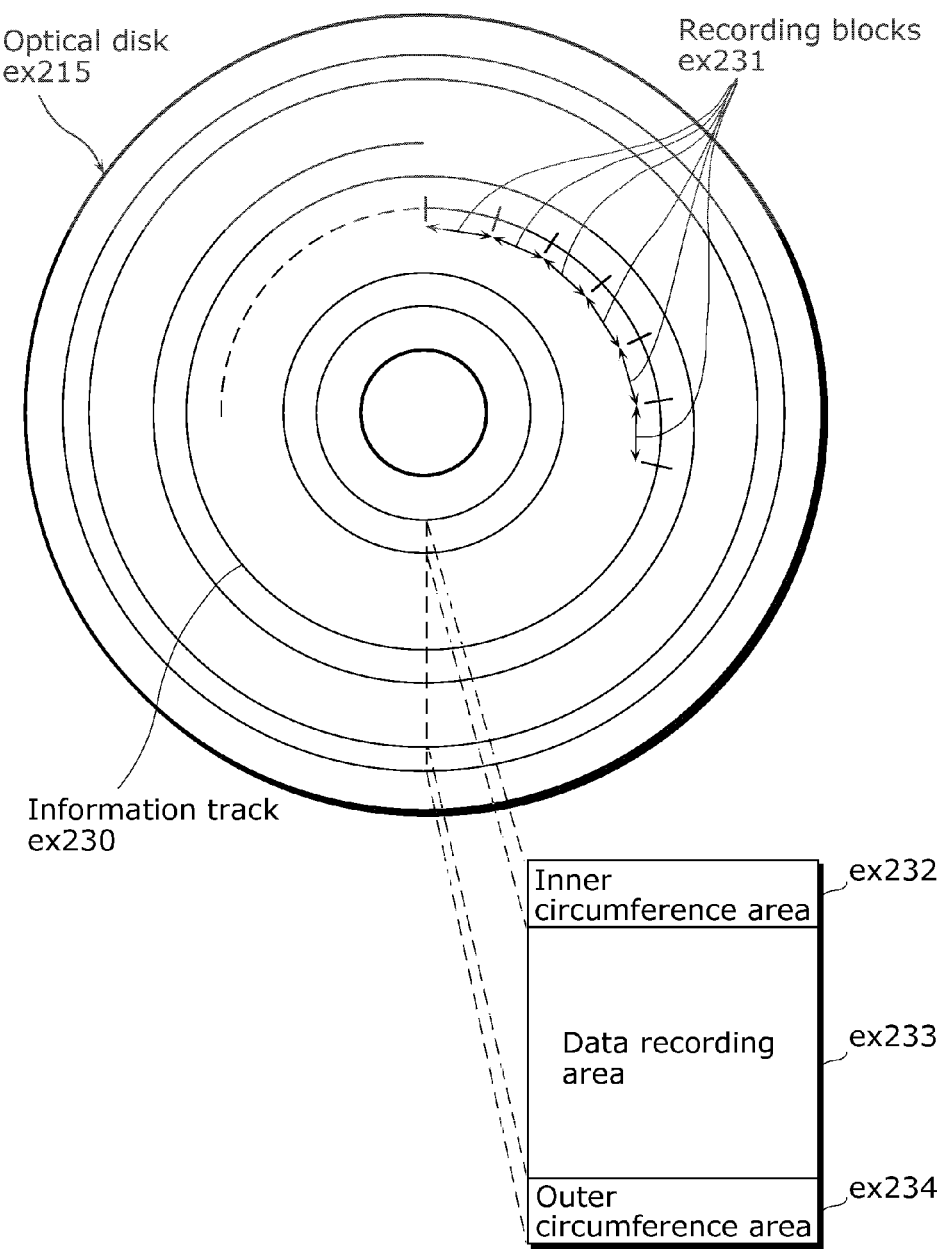
FIG. 27 shows an example of a configuration of a recording medium that is an optical disk.

FIG. 27 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 25. The same will be true for the configuration of the computer ex111, the cellular phone ex114, and others.

Figure 28A:
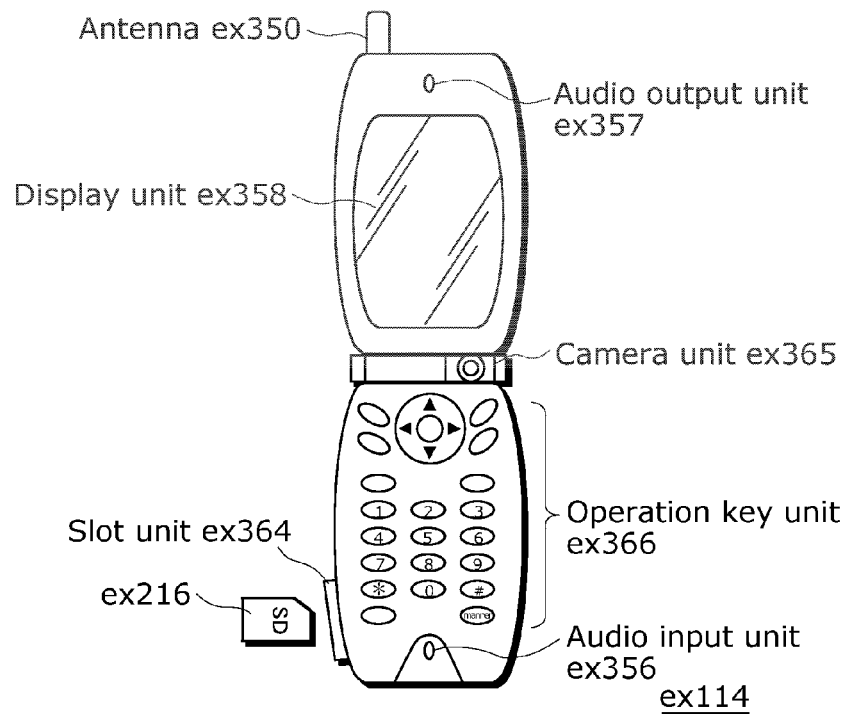
FIG. 28A shows an example of a cellular phone.

FIG. 28A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 28B:
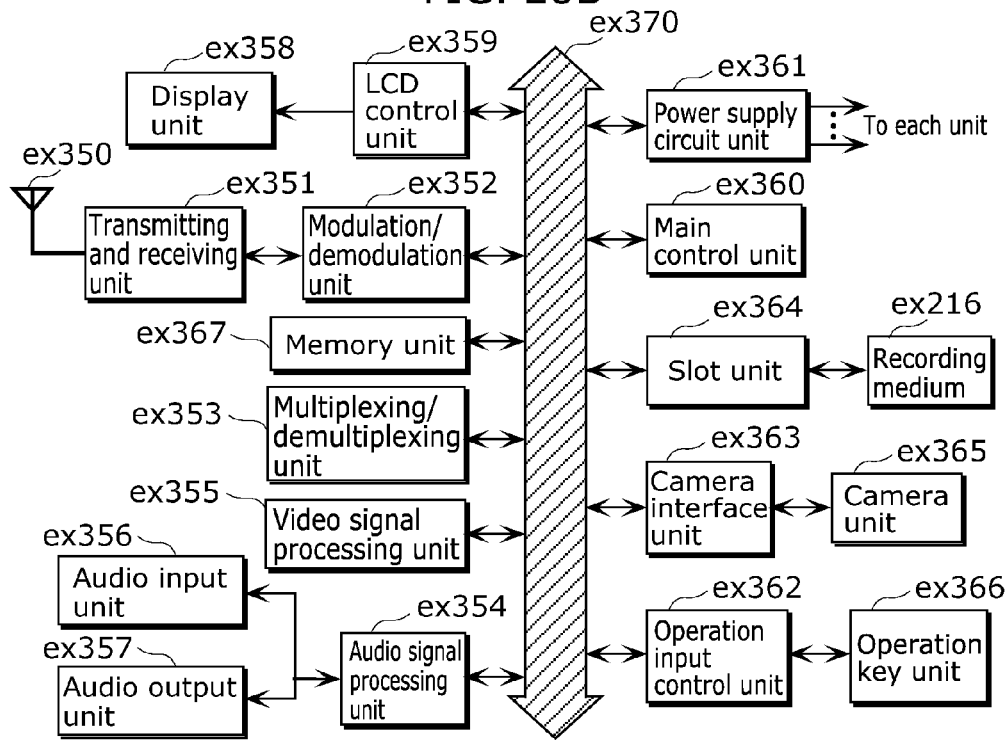
FIG. 28B is a block diagram showing an example of a configuration of a cellular phone.

Next, an example of a configuration of the cellular phone ex114 will be described with reference to FIG. 28B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present invention), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 5

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 29 illustrates a structure of the multiplexed data. As illustrated in FIG. 29, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 30:
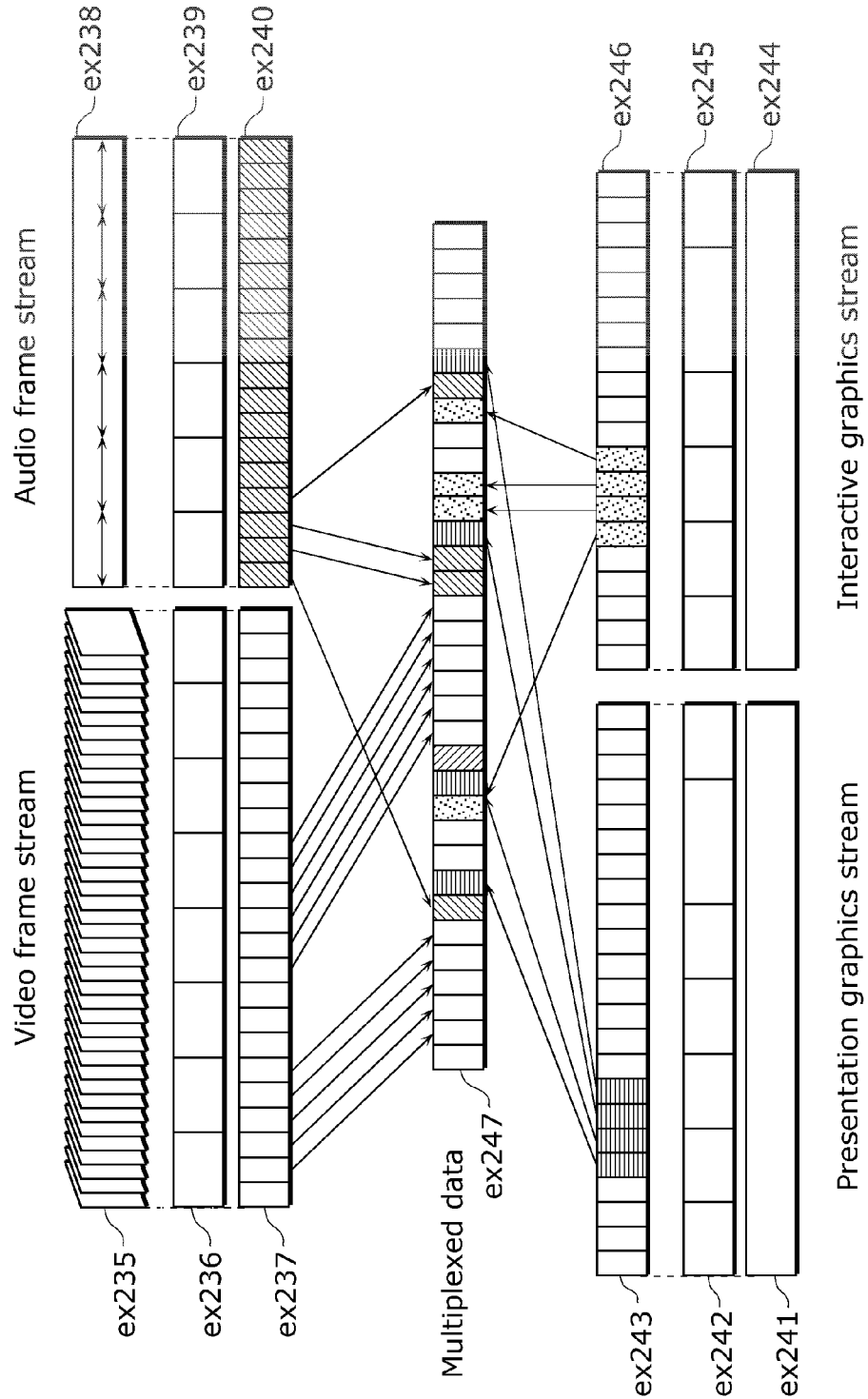
FIG. 30 schematically shows how each stream is multiplexed in multiplexed data.

FIG. 30 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 31:
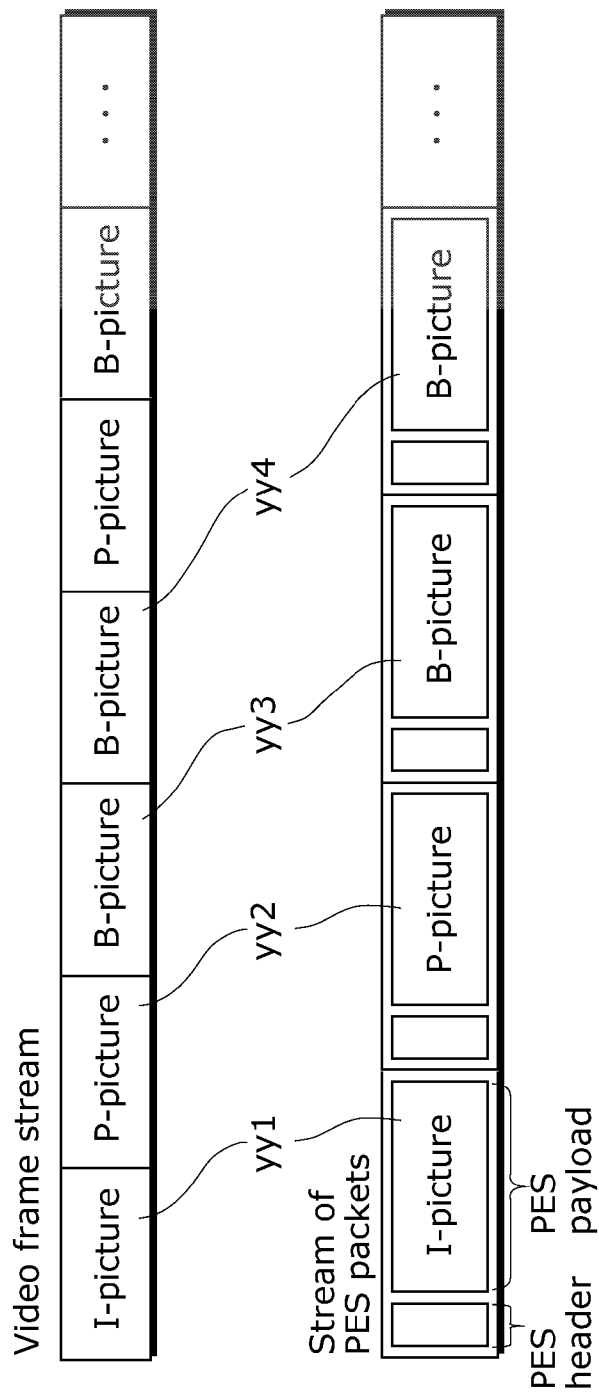
FIG. 31 shows how a video stream is stored in a stream of PES packets in more detail.

FIG. 31 illustrates how a video stream is stored in a stream of PES packets in more detail. The first bar in FIG. 31 shows a video frame stream in a video stream. The second bar shows the stream of PES packets. As indicated by arrows denoted as yy1, yy2, yy3, and yy4 in FIG. 31, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 32:
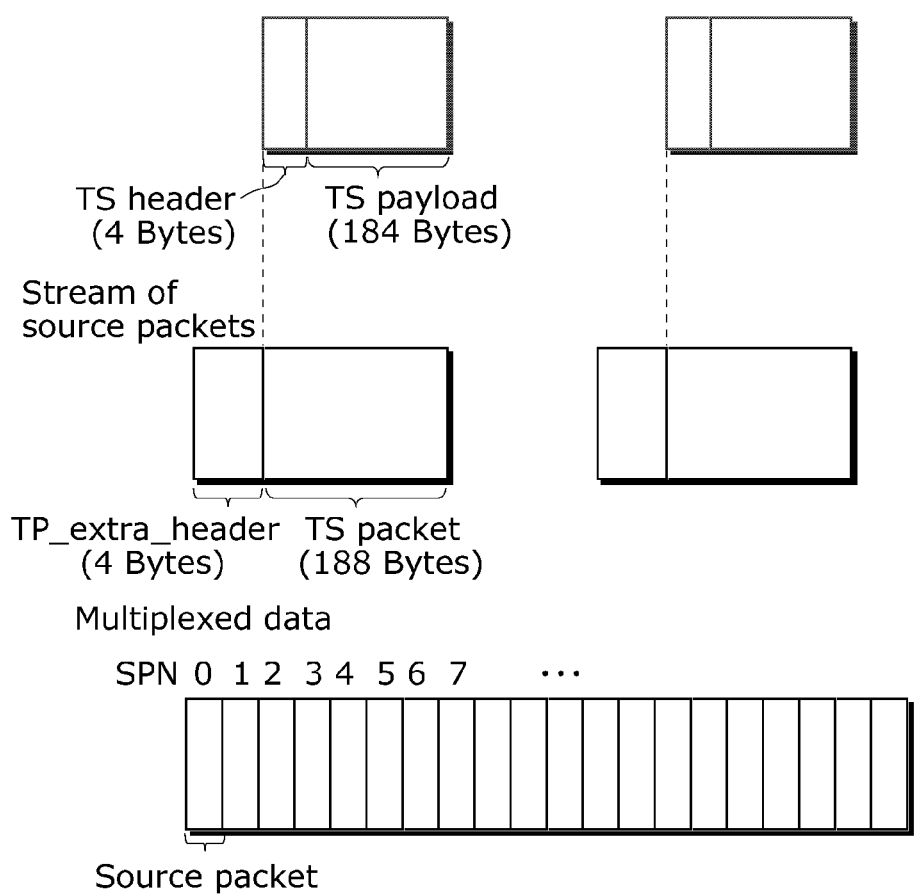
FIG. 32 shows a structure of TS packets and source packets in the multiplexed data.

FIG. 32 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 32. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 33:
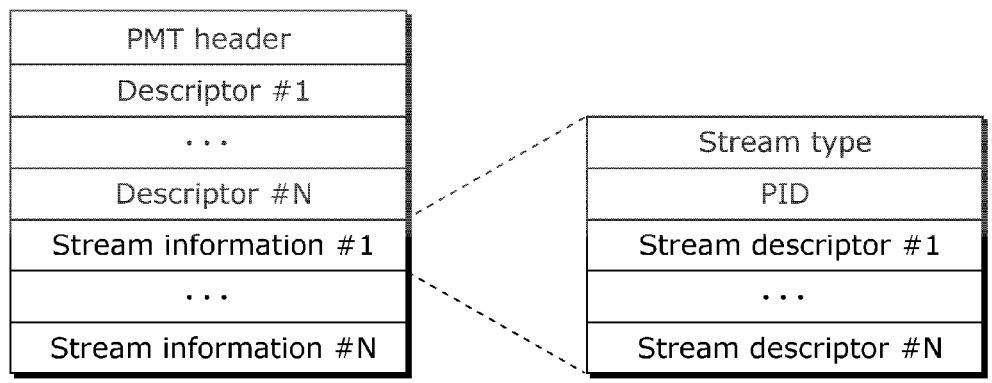
FIG. 33 shows a data structure of a PMT.

FIG. 33 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 34:
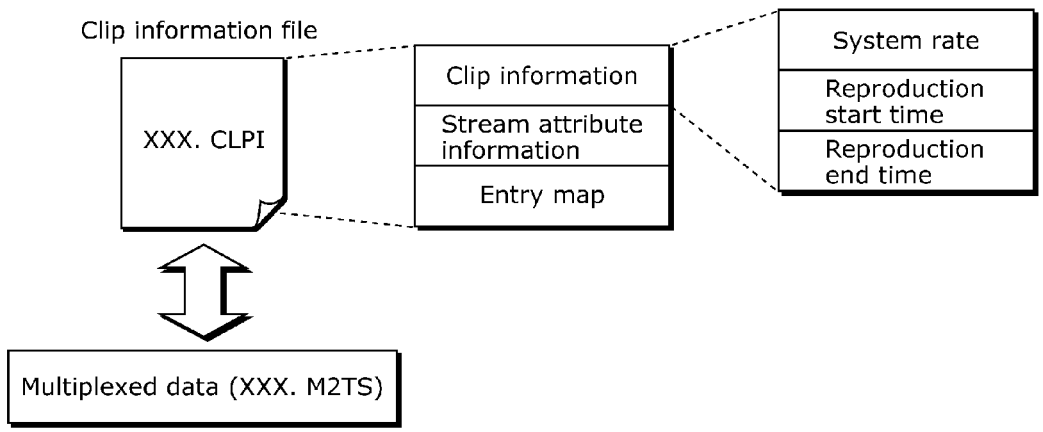
FIG. 34 shows an internal structure of multiplexed data information.

Each of the multiplexed data information files is management information of the multiplexed data as shown in FIG. 34. The multiplexed data information files are in one to one correspondence with the multiplexed data, and each of the files includes multiplexed data information, stream attribute information, and an entry map.

As illustrated in FIG. 34, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 35:
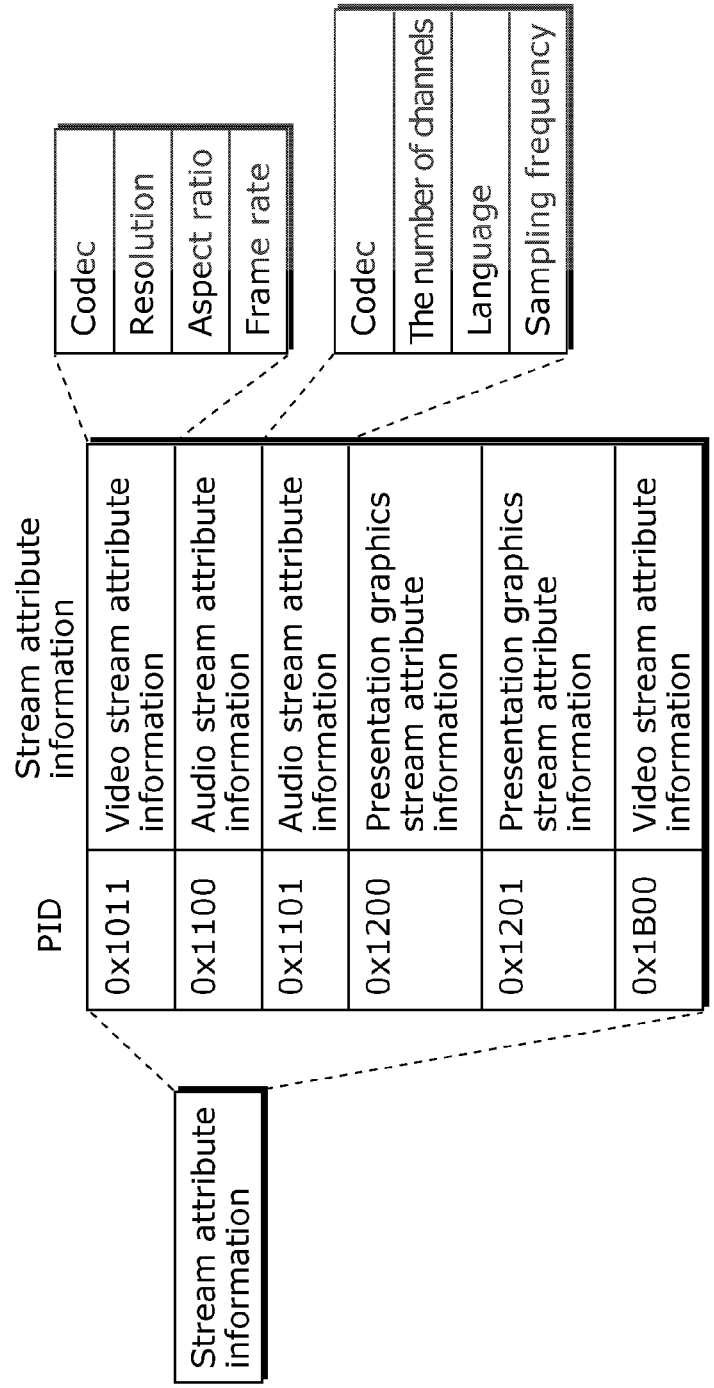
FIG. 35 shows an internal structure of stream attribute information.

As shown in FIG. 35, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 36:
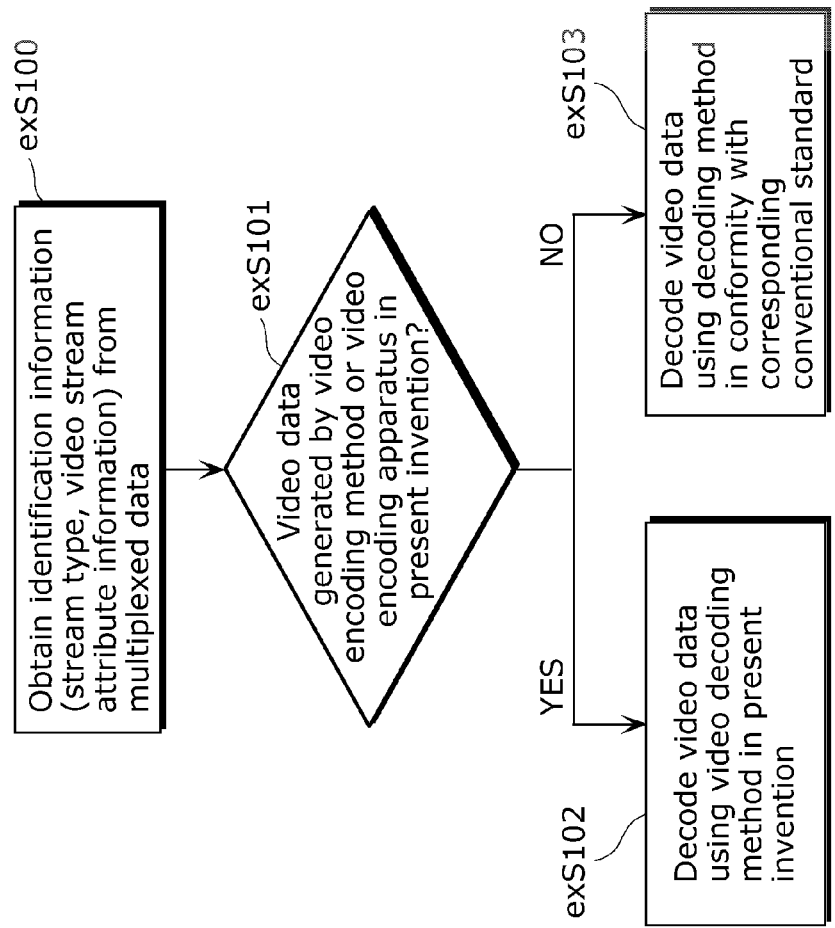
FIG. 36 shows steps for identifying video data.

Furthermore, FIG. 36 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture coding method in each of embodiments, in Step exS102, decoding is performed by selecting a reference picture or a motion vector from candidates according to the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards. For example, when the attribute information shows that the stream conforms to the MPEG-4 AVC standard, the stream is decoded on a block-by-block basis using a motion vector not selected from the candidates but calculated from a motion vector of at least one block that is spatially or temporally adjacent to a current block.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 6

Figure 37:
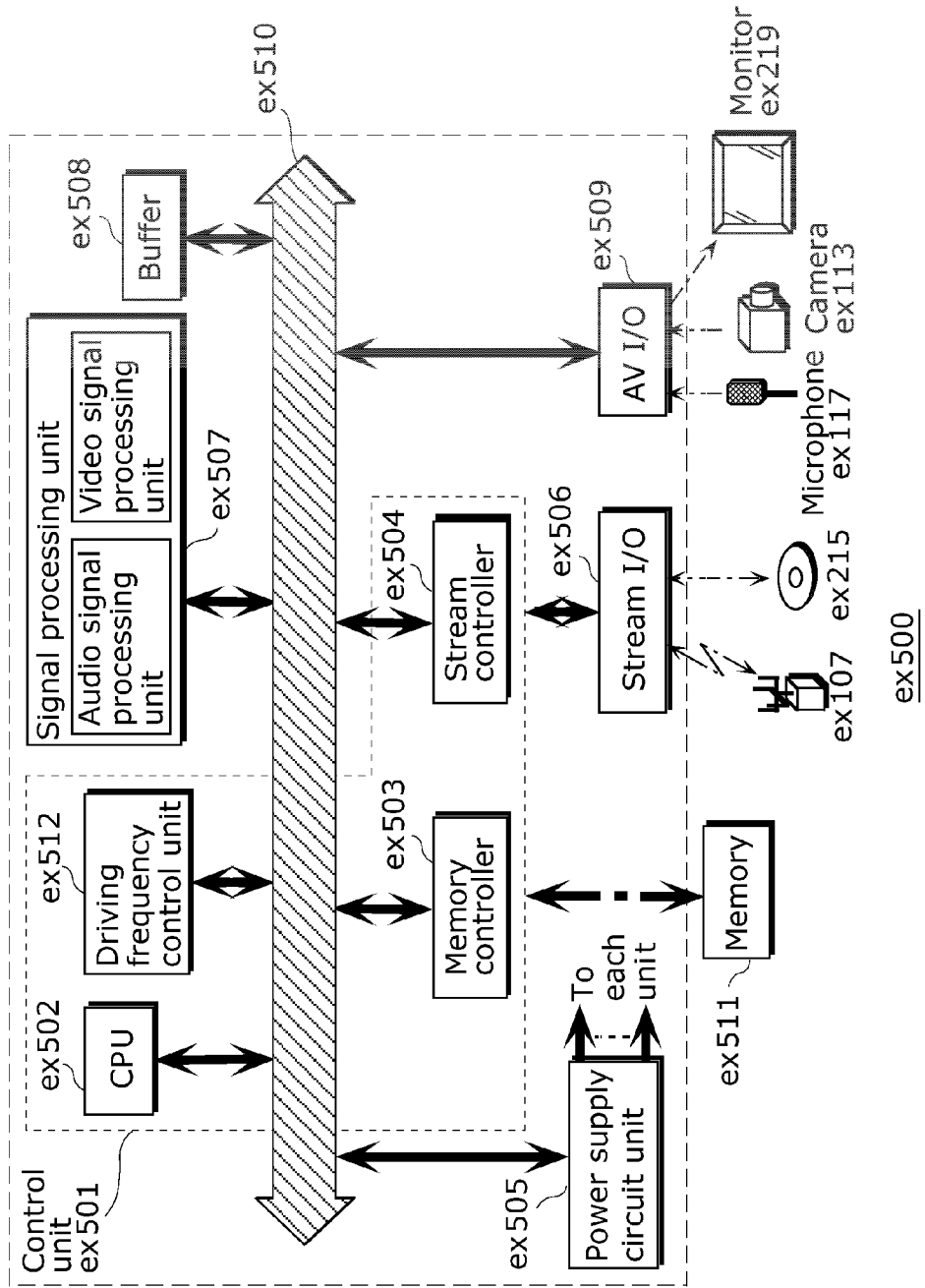
FIG. 37 shows an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 37 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present invention is applied to biotechnology.

Embodiment 7

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. there is a problem that the power consumption increases.

Figure 38:
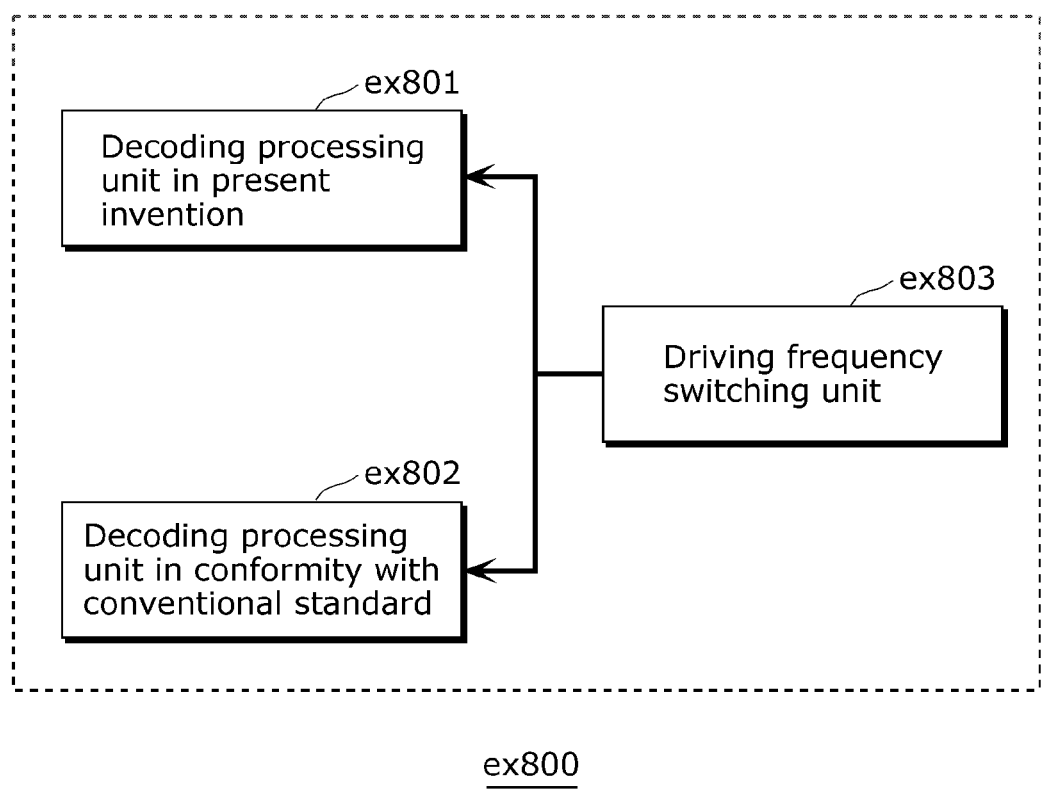
FIG. 38 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 38 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 37. Here, each of the decoding processing unit ex801 that executes the moving picture decoding method described in each of embodiments and the decoding processing unit ex802 that conforms to the conventional standard corresponds to the signal processing unit ex507 in FIG. 37. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 40. The driving frequency can be selected by storing the look-up table in the buffer ex508 and in an internal memory of an LSI, and with reference to the look-up table by the CPU ex502.

Figure 39:
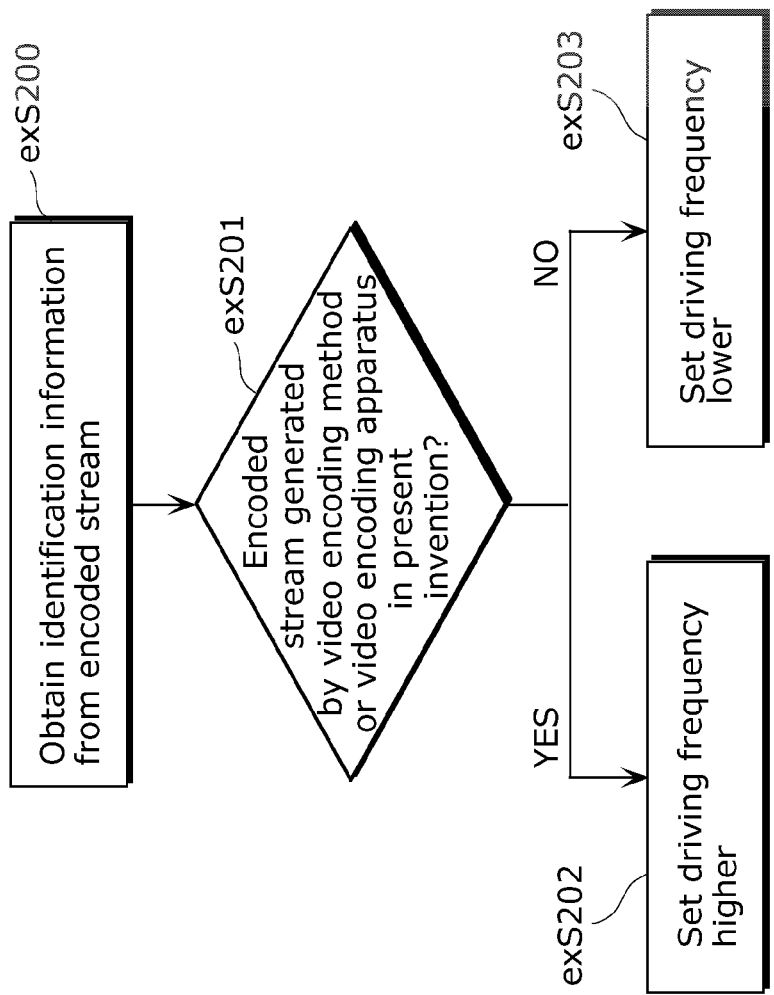
FIG. 39 shows steps for identifying video data and switching between driving frequencies.

FIG. 39 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 41A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present invention and does not conform to MPEG-4 AVC. Since the aspect of the present invention is characterized by motion compensation in particular, for example, the dedicated decoding processing unit ex901 is used for motion compensation. Otherwise, the decoding processing unit is probably shared for one of the entropy decoding, deblocking filtering, and inverse quantization, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 41B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The present invention can be used for, for example, a television set, a digital video recorder, a car navigation system, a mobile phone, a digital camera, or a digital video camera.

REFERENCE SIGNS LIST

100, 300 Image encoding apparatus
101 Subtraction unit
102 Orthogonal transformation unit
103 Quantization unit
104 Variable-length encoding unit
105, 205 Inverse quantization unit
106, 206 Inverse orthogonal transformation unit
107, 207 Addition unit
108, 208 Block memory
109, 209 Frame memory
110, 210 Intra-prediction unit
111, 211 Inter-prediction unit
112, 212 Switching unit
113 Picture type determination unit
114, 214 Inter-prediction control unit
115, 215 Reference picture list calculation unit
116, 216 Motion-vector-predictor candidate calculation unit
200, 400 Image decoding apparatus
204 Variable-length decoding unit
301, 401 Generation unit
302 Encoding unit
402 Decoding unit

The invention claimed is:

1. An image encoding method of encoding a current picture on a block-by-block basis, the image encoding method comprising:
generating a reference picture list by (i) assigning a reference picture index to at least one reference picture referable for encoding the current picture and (ii) including the at least one reference picture assigned the reference picture index into the reference picture list; and
encoding a current block included in the current picture with reference to a reference picture of the at least one reference picture that is specified, from the reference picture list, for encoding the current block,
wherein, when the at least one reference picture includes a reference picture belonging to a reference view different from a current view to which the current picture belongs and the reference picture belonging to the reference view has a chance of being referenced for encoding the current picture, the reference picture belonging to the reference view is added to the reference picture list in the generating, and
the reference picture index is modified for each of all reference pictures of the at least one reference picture included in the reference picture list, in a range which is determined based on a total number, of all the reference pictures, of a sum of (i) a total number of referable reference pictures belonging to the current view and (ii) a total number of referable reference pictures belonging to the reference view.

2. The image encoding method according to claim 1,
wherein the reference picture list is generated using a parameter in the generating, and
the parameter used for generating the reference picture list is further encoded in the encoding.

3. The image encoding method according to claim 1,
wherein, in the generating, whether or not the reference picture belonging to the reference view has the chance of being referenced for encoding the current picture is further determined based on whether or not the current view is a non-base view.

4. The image encoding method according to claim 3,
wherein, in the generating, whether or not the current view is the non-base view is determined based on a view order index assigned to the current view in encoding order.

5. An image decoding method of decoding a current picture on a block-by-block basis, the image decoding method comprising:
generating a reference picture list by (i) assigning a reference picture index to at least one reference picture referable for decoding the current picture and (ii) including the at least one reference picture assigned the reference picture index into the reference picture list; and
decoding a current block included in the current picture with reference to a reference picture of the at least one reference picture that is specified, from the reference picture list, for decoding the current block,
wherein, when the at least one reference picture includes a reference picture belonging to a reference view different from a current view to which the current picture belongs and the reference picture belonging to the reference view has a chance of being referenced for decoding the current picture, the reference picture belonging to the reference view is added to the reference picture list in the generating, and
the reference picture index is modified for each of all reference pictures of the at least one reference picture included in the reference picture list, in a range which is determined based on a total number, of all the reference pictures, of a sum of (i) a total number of referable reference pictures belonging to the current view and (ii) a total number of referable reference pictures belonging to the reference view.

6. The image decoding method according to claim 5,
wherein a parameter used for generating the reference picture list is further decoded in the decoding, and
the reference picture list is generated using the decoded parameter in the generating.

7. The image decoding method according to claim 5,
wherein, in the generating, whether or not the reference picture belonging to the reference view has the chance of being referenced for decoding the current picture is further determined based on whether or not the current view is a non-base view.

8. The image decoding method according to claim 7,
wherein, in the generating, whether or not the current view is the non-base view is determined based on a view order index assigned to the current view in decoding order.

9. An image encoding apparatus which encodes a current picture on a block-by-block basis, the image encoding apparatus comprising:
- a generation unit configured to generate a reference picture list by (i) assigning a reference picture index to at least one reference picture referable for encoding the current picture and (ii) including the at least one reference picture assigned the reference picture index into the reference picture list;
- an encoding unit configured to encode a current block included in the current picture with reference to a reference picture of the at least one reference picture that is specified, from the reference picture list, for encoding the current block; and
- a reference picture list calculation unit,
- wherein, when the at least one reference picture includes a reference picture belonging to a reference view different from a current view to which the current picture belongs and the reference picture belonging to the reference view has a chance of being referenced for encoding the current picture, the generation unit is configured to add the reference picture belonging to the reference view to the reference picture list, and
- the reference picture list calculation unit is configured to modify the reference picture index for each of all reference pictures of the at least one reference picture included in the reference picture list, in a range which is determined based on a total number, of all the reference pictures, of a sum of (i) a total number of referable reference pictures belonging to the current view and (ii) a total number of referable reference pictures belonging to the reference view.

10. An image decoding apparatus which decodes a current picture on a block-by-block basis, the image decoding apparatus comprising:
- a generation unit configured to generate a reference picture list by (i) assigning a reference picture index to at least one reference picture referable for decoding the current picture and (ii) including the at least one reference picture assigned the reference picture index into the reference picture list;
- a decoding unit configured to decode a current block included in the current picture with reference to a reference picture of the at least one reference picture that is specified, from the reference picture list, for decoding the current block; and
- a reference picture list calculation unit,
- wherein, when the at least one reference picture includes a reference picture belonging to a reference view different from a current view to which the current picture belongs and the reference picture belonging to the reference view has a chance of being referenced for decoding the current picture, the generation unit is configured to add the reference picture belonging to the reference view to the reference picture list, and
- the reference picture list calculation unit is configured to modify the reference picture index for each of all reference pictures of the at least one reference picture included in the reference picture list, in a range which is determined based on a total number, of all the reference pictures, of a sum of (i) a total number of referable reference pictures belonging to the current view and (ii) a total number of referable reference pictures belonging to the reference view.

11. An image coding apparatus comprising:
the image encoding apparatus according to claim 9; and
an image decoding apparatus which decodes a current picture on a block-by-block basis,
wherein the image decoding apparatus includes:
- a generation unit configured to generate a reference picture list by (i) assigning a reference picture index to at least one reference picture referable for decoding the current picture and (ii) including the at least one reference picture assigned the reference picture index into the reference picture list;
- a decoding unit configured to decode a current block included in the current picture with reference to a reference picture of the at least one reference picture that is specified, from the reference picture list, for decoding the current block; and
- a reference picture list calculation unit,
- wherein, when the at least one reference picture includes a reference picture belonging to a reference view different from a current view to which the current picture belongs and the reference picture belonging to the reference view has a chance of being referenced for decoding the current picture, the generation unit is configured to add the reference picture belonging to the reference view to the reference picture list, and
- the reference picture list calculation unit is configured to modify the reference picture index for each of all reference pictures of the at least one reference picture included in the reference picture list, in a range which is determined based on a total number, of all the reference pictures, of a sum of (i) a total number of referable reference pictures belonging to the current view and (ii) a total number of referable reference pictures belonging to the reference view.

12. An image encoding apparatus which encodes a current picture on a block-by-block basis, the image encoding apparatus comprising:
- a processor; and
- a non-transitory computer-readable recording medium having stored thereon executable instructions, which, when executed by the processor, cause the image encoding apparatus to:
- generate a reference picture list by (i) assigning a reference picture index to at least one reference picture referable for encoding the current picture and (ii) including the at least one reference picture assigned the reference picture index into the reference picture list; and
- encode a current block included in the current picture with reference to a reference picture of the at least one reference picture that is specified, from the reference picture list, for encoding the current block,
- wherein, when the at least one reference picture includes a reference picture belonging to a reference view different from a current view to which the current picture belongs and the reference picture belonging to the reference view has a chance of being referenced for encoding the current picture, the executable instructions, when executed by the processor, further cause the image encoding apparatus to add the reference picture belonging to the reference view to the reference picture list, and
- modify the reference picture index for each of all reference pictures of the at least one reference picture included in the reference picture list, in a range which is determined based on a total number, of all the reference pictures, of a sum of (i) a total number of referable reference pictures belonging to the current view and (ii) a total number of referable reference pictures belonging to the reference view.

13. An image decoding apparatus which decodes a current picture on a block-by-block basis, the image decoding apparatus comprising:

a processor; and a non-transitory computer-readable recording medium having stored thereon executable instructions, which, when executed by the processor, cause the image decoding apparatus to:

generate a reference picture list by (i) assigning a reference picture index to at least one reference picture referable for decoding the current picture and (ii) including the at least one reference picture assigned the reference picture index into the reference picture list; and decode a current block included in the current picture with reference to a reference picture of the at least one reference picture that is specified, from the reference picture list, for decoding the current block, wherein, when the at least one reference picture includes a reference picture belonging to a reference view different from a current view to which the current picture belongs and the reference picture belonging to the reference view has a chance of being referenced for decoding the current picture, the executable instructions, when executed by the processor, further cause the image decoding apparatus to add the reference picture belonging to the reference view to the reference picture list, and modify the reference picture index for each of all reference pictures of the at least one reference picture included in the reference picture list, in a range which is determined based on a total number, of all the reference pictures, of a sum of (i) a total number of referable reference pictures belonging to the current view and (ii) a total number of referable reference pictures belonging to the reference view.

* * * * *